(12) United States Patent
Strathman

(10) Patent No.: US 11,559,076 B2
(45) Date of Patent: Jan. 24, 2023

(54) EXTRUDER WITH NON-STOP DIE CHANGE DEVICE AND METHOD OF USING SAME

(71) Applicant: Famsun Co., Ltd, Jiangsu (CN)

(72) Inventor: Robert Timothy Strathman, Jiangsu (CN)

(73) Assignee: FAMSUN CO., LTD, Jiangsu (CN)

( * ) Notice: Subject to any disclaimer, the term of this patent is extended or adjusted under 35 U.S.C. 154(b) by 0 days.

(21) Appl. No.: 17/498,032

(22) Filed: Oct. 11, 2021

(65) Prior Publication Data

US 2022/0022517 A1  Jan. 27, 2022

Related U.S. Application Data

(60) Division of application No. 16/185,339, which is a continuation of application No. PCT/CN2017/099624, filed on Aug. 30, 2017, now Pat. No. 11,178,897.

(30) Foreign Application Priority Data

May 11, 2017 (CN) .......................... 201710329046.1
May 11, 2017 (CN) .......................... 201710329050.8

(51) Int. Cl.
*A23P 30/20* (2016.01)
*A23P 30/34* (2016.01)

(52) U.S. Cl.
CPC ............... *A23P 30/20* (2016.08); *A23P 30/34* (2016.08)

(58) Field of Classification Search
None
See application file for complete search history.

(56) References Cited

U.S. PATENT DOCUMENTS 5,238,385 A * 8/1993 Johnson ................. A21C 11/16
425/464

FOREIGN PATENT DOCUMENTS

CN  201663906 U  * 12/2010
CN  204259798 U  *  4/2015

* cited by examiner

*Primary Examiner* — Mohammad M Ameen
(74) *Attorney, Agent, or Firm* — Locke Lord LLP; Tim Tingkang Xia, Esq.

(57) ABSTRACT

An extruder with a non-stop die change device includes an extrusion cavity, a die change device located at the outlet of the extrusion cavity, and a first die and a second die that are connected to the side wall of a housing of the die change device. A transfer channel is provided in a movable block of the die change device. When the movable block moves to a first position in the housing, the transfer channel communicates to the extrusion cavity with a first channel, and when the movable block moves to a second position in the housing, the transfer channel communicates to the extrusion cavity with a second channel. Therefore, die change and product type change can be achieved without stopping the extruder. If a die is blocked, the extruder does not need to stop for changing a new die.

13 Claims, 33 Drawing Sheets

US 11,559,076 B2

EXTRUDER WITH NON-STOP DIE CHANGE DEVICE AND METHOD OF USING SAME

CROSS-REFERENCE TO RELATED APPLICATIONS

This application is a divisional application of U.S. patent application Ser. No. 16/185,339, filed Nov. 9, 2018, now allowed, which is a continuation application of International Patent Application No. PCT/CN2017/099624, filed Aug. 30, 2017, which itself claims the priority to Chinese Patent Application Nos. CN201710329050.8 and CN201710329046.1, both filed May 11, 2017 in the State Intellectual Property Office of P.R. China, which are hereby incorporated herein in their entireties by reference.

FIELD OF THE INVENTION

The invention relates generally to the field of food and feeds, and more particularly, to an extruder with a non-stop die change device and a method of using the same for processing pet food, human food and aquatic feeds.

BACKGROUND OF THE INVENTION

The background description provided herein is for the purpose of generally presenting the context of the invention and is neither expressly nor impliedly admitted as prior art against the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Extruders are usually used in the food and feed industries in order to process high cured products. However, the current extrusion production line has shortcomings. For example, the extruders have low operation efficiency, where changing dies and varieties of products take a long time.

Extruded products in the food and feed industries have many formulas, generally 10-15 formulas. They may have 20-30 formulas, or even more. There are also multiple specifications of dies, generally at least more than 10 dies. Combinations of different formulas with different dies may result in over 200 products.

Usually, an extrusion production line often produces 3 to 8 different products a day. Every time when a product is changed, it needs to stop the extruder, detach the die, clean the extruder, install another die and then start the extruder. Such a process takes a long time, generally 30 to 60 minutes. If the operator is unskilled, the time for changing the product may take 120 minutes or more.

In addition to the varieties of products, the die of the extruder is often blocked by fibers and impurities in the raw materials during the production process. After the die is blocked, the granules are deformed and the productivity is reduced. The only way to solve this problem is to stop the machine and replace the die. It also needs to detach the die, clean the extruder, install another die and then start the extruder during each stop for replacing the die. A quite long time is taken.

Due to the above factors, the efficiency of the effective operation of the extruder is quite low. This challenge with the need to solve the problem is that the rapid die change requires a rapid knife hood change and both knife hoods are necessary when a product is flowing through both dies simultaneously.

Therefore, a heretofore unaddressed need exists in the art to address the aforementioned deficiencies and inadequacies.

SUMMARY OF THE INVENTION

One of the objectives of the invention is to solve the above problems by providing an extruder with a non-stop die change device, in which a plurality of dies can be used at the same time, the dies can be changed without being detached, and meanwhile, the extruder does not need to stop during the die change. In addition, the invention further provides a method of using the above extruder.

In one aspect of the invention, the extruder with a non-stop die change device includes an extrusion cavity, a feeding port located at the upper part in the extrusion cavity, and a die change device located at the outlet of the extrusion cavity; a conveyor for conveying a material to the die change device is arranged in the extrusion cavity; the die change device includes a housing, a movable block located in the housing, a driving device for driving the movable block, a first die connected to the side wall of the housing, and a second die connected to the side wall of the housing. The first die is provided with a first channel that penetrates the first die and communicates with the interior of the housing. The second die is provided with a second channel that penetrates the second die and communicates with the interior of the housing. The outlet of the extrusion cavity is connected to the side wall of the housing and communicates with the interior of the housing. A transfer channel is provided in the movable block, and the movable block is driven by the driving device to move at a first position to a second position. When the movable block moves to the first position in the housing, the transfer channel communicates to the extrusion cavity with the first channel. When the movable block moves to the second position in the housing, the transfer channel communicates to the extrusion cavity with the second channel.

The extruder with the non-stop die change device has the advantages of which, by driving the movable block, the extrusion cavity can communicate with different dies without stopping, when the product variety is changed, and if a die is blocked, the die does not need to be replaced with a new die by stopping the operation. It is noted that only two dies are given in the above exemplary embodiment. It should be appreciated that two or more dies can also be utilized to practice the invention.

The movable block is a piston or a rotating block that rotates in the housing.

In one embodiment, when a piston located inside the housing is selected as the movable block; at least one first transfer channel and at least one second transfer channel are provided in the piston; when the piston moves to the first position in the housing, the first transfer channel communicates to the extrusion cavity with the first channel; and when the piston moves to the second position in the housing, the second transfer channel communicates to the extrusion cavity with the second channel.

In another aspect, the invention also provides the method of using the extruder with the non-stop die change device when a piston is used as the movable block. When only the first die is used for production, the driving device forces the piston to move to the first position, the first transfer channel communicates to the extrusion cavity with the first channel, and the material is conveyed into the first die through the conveyor in the extrusion cavity. When only the second die is used for production, the driving device forces the piston to move to the second position, the second transfer channel communicates to the extrusion cavity with the second channel, and the material is conveyed into the second die through the conveyor in the extrusion cavity.

In one embodiment, at least one third transfer channel is provided in the piston; when the piston moves to a third position in the housing, the third transfer channel communicates to the extrusion cavity with the first channel and the second channel simultaneously. According to the invention, the first die and the second die (or more dies) can be used at the same time, which can expand the application of the extruder, and produce two or more kinds of products at the same time.

As for the extruder with the third transfer channel, the invention also provides a method of using the extruder, that is, when only the first die is used for production, the driving device forces the piston to move to the first position, the first transfer channel communicates to the extrusion cavity with the first channel, and the material is conveyed into the first die through the conveyor in the extrusion cavity; when only the second die is used for production, the driving device forces the piston to move to the second position, the second transfer channel communicates to the extrusion cavity with the second channel, and the material is conveyed into the second die through the conveyor in the extrusion cavity; and when the first die and the second die are simultaneously used for production, the driving device forces the piston to move to the third position, the third transfer channel communicates to the extrusion cavity with the first channel and the second channel at the same time, and the material is simultaneously conveyed into the first die and the second die through the conveyor in the extrusion cavity.

In one embodiment, the first transfer channel includes a first inlet and a first outlet, the second transfer channel includes a second inlet and a second outlet, and the side wall of the housing is provided with a feeding port for connecting the interior of the housing with the outlet of the extrusion cavity, a first discharging port for connecting the interior of the housing with the first transfer channel and a second discharging port for connecting the interior of the housing with the second transfer channel.

When the mechanical energy borne by the material needs to be adjusted, the invention provides the following technical solution. When only the first die is used for production and adjusting the mechanical energy borne by the material, the driving device forces the piston to move so that the first transfer channel communicates to the extrusion cavity with the first channel, at this time, the first inlet is in misalignment communication with the feeding port on the housing, and the material is conveyed from the feeding port to the first inlet through the conveyor in the extrusion cavity and conveyed into the first die through the first outlet; and when only the second die is used for production and adjusting the mechanical energy borne by the material, the driving device forces the piston to move so that the second transfer channel communicates to the extrusion cavity with the second channel, at this time, the second inlet is in misalignment communication with the feeding port on the housing, and the material is conveyed from the feeding port to the second inlet through the conveyor in the extrusion cavity and conveyed into the second die through the second outlet.

According to the method, when a certain die is used, the feeding port is misaligned with a certain inlet, that is, a formed channel opening is actually smaller than the feeding port, the resistance formed by the material at the channel opening becomes large, and if the degree of misalignment is larger, the resistance is larger and the mechanical energy borne by the material is also larger. The mechanical energy borne by the material can be adjusted by adjusting the size of the channel opening.

Based on the same principle, when at least one third transfer channel is provided in the piston, the first die and the second die are simultaneously used for production and adjusting the mechanical energy borne by the material, the driving device forces the piston to move, the third transfer channel communicates to the extrusion cavity with the first channel and the second channel simultaneously, at this time, the third inlet is in misalignment communication with the feeding port on the housing, and the material is conveyed from the feeding port to the third inlet through the conveyor in the extrusion cavity and conveyed into the first die and the second die simultaneously through two third outlets.

In one embodiment, when a rotating block is selected, the block will rotate as it aligns the channel with the first position in the housing, a first port communicates with the extrusion cavity, and a second port communicates with the first channel; and when the rotating block rotates to the second position in the housing, the second port communicates with the extrusion cavity, and the first port communicates with the second channel.

According to the embodiment, when a rotating block is used as the movable block, the method of using the above extruder with the non-stop die change device includes: when only the first die is used for production, the driving device drives the rotating block to rotate to the first position, the first port communicates with the extrusion cavity, the second port communicates with the first channel, and the material is conveyed into the first die through the conveyor in the extrusion cavity; and when only the second die is used for production, the driving device drives the rotating block to rotate to the second position, the second port communicates with the extrusion cavity, the first port communicates with the second channel, and the material is conveyed into the second die through the conveyor in the extrusion cavity.

The extruder further includes a three-way rotating block that replaces the rotating block; after the three-way rotating block replaces the rotating block, it is also driven by the driving device to rotate in the housing; the three-way rotating block is provided with a three-way transfer channel, including a channel I, and a channel II and a channel III that communicate with the channel I at the same time; and when the three-way rotating block rotates in the housing till the channel I communicates with the extrusion cavity, the channel II communicates with the first channel and the channel III communicates with the second channel. The further technical feature achieves the effect of using the first die and the second die at the same time, expands the application of the extruder, and can produce two or more kinds of products at the same time.

As for the extruder with the three-way rotating block, the invention also provides a method of using the extruder, that is, when the first die and the second die are simultaneously used for production, the rotating block is replaced with the three-way rotating block, and when the driving device drives the three-way rotating block to rotate till the channel I communicates with the extrusion cavity, the channel II communicates with the first channel and the channel III communicates with the second channel.

In one embodiment, the side wall of the housing is provided with a feeding port for connecting the interior of the housing with the outlet of the extrusion cavity, a first discharging port for connecting the interior of the housing with the first transfer channel and a second discharging port for connecting the interior of the housing with the second transfer channel.

When the mechanical energy borne by the material needs to be adjusted, the invention provides the following technical solution of a using method. When only the first die is used for production and adjusting the mechanical energy borne by the material, the driving device drives the rotating block to rotate so that the first port communicates with the extrusion cavity, the second port communicates with the first channel, at this time, the first port is in misalignment communication with the feeding port on the housing, and the material is conveyed from the feeding port to the first port through the conveyor in the extrusion cavity and conveyed into the first die through the second port; and when only the second die is used for production and adjusting the mechanical energy borne by the material, the driving device drives the rotating block to rotate so that the second port communicates with the extrusion cavity, the first port communicates with the second channel, at this time, the second port is in misalignment communication with the feeding port on the housing, and the material is conveyed from the feeding port to the second port through the conveyor in the extrusion cavity and conveyed into the second die through the first port.

According to the method, when a certain die is used, the feeding port is misaligned with a certain port, that is, a formed channel opening is actually smaller than the feeding port, the resistance formed by the material at the channel opening becomes large, and if the degree of misalignment is larger, the resistance is larger and the mechanical energy borne by the material is also larger. The mechanical energy borne by the material can be adjusted by adjusting the size of the channel opening.

Based on the same principle, when the first die and the second die are simultaneously used for production and adjusting the mechanical energy borne by the material, the rotating block is replaced with a three-way rotating block and the driving device drives the three-way rotating block to rotate till the channel I communicates with the extrusion cavity, the channel II communicates with the first channel and the channel III communicates with the second channel; at this time, the channel I is in misalignment communication with the feeding port on the housing, and the material is conveyed from the feeding port to the channel I through the conveyor in the extrusion cavity and conveyed to the first die through the channel II; and the material is conveyed to the second die through the channel III.

In one embodiment, the extruder also includes a first cutting device connected with the first die, a second cutting device connected with the second die, a first air duct connected with the first cutting device, and a second air duct connected with the second cutting device. The cutting devices are used separately corresponding to different dies.

In one embodiment, the extruder also includes a three-way valve connected with the first air duct and the second air duct at the same time; the three-way valve is provided with a first inlet, a second inlet and a switch valve outlet, the first inlet communicates with the first air duct, and the second inlet communicates with the second air duct.

In one embodiment, the three-way switch includes a switch plate located between the two inlets and the switch valve outlet and a driving device for driving the switch plate, and the switch plate is provided with a first channel port and a second channel port; when the first inlet is used, the switch plate is driven to enable the first channel port to be aligned with the first inlet, and the switch plate blocks the second inlet; when the first inlet and the second inlet are used simultaneously, the driving device drives the switch plate to move forward, so that the first channel port is aligned with the second inlet and the second channel port is aligned with the first inlet; and when the second inlet is used, the driving device continues to drive the switch plate to move forward, the second channel port is aligned with the second inlet, and the switch plate blocks the first inlet.

In one embodiment, the first air duct includes a first vertical air duct connected with the first cutting device and extending upward from the first cutting device, a first bend connected to the upper end of the first vertical air duct and bent to the horizontal direction, and a first horizontal air duct connected to the horizontal end of the first bend and continuously horizontally extending to connect with the first inlet; and the second air duct includes a second vertical air duct connected with the second cutting device and extending upward from the second cutting device, a second bend connected to the upper end of the second vertical air duct and bent to the horizontal direction, and a second horizontal air duct connected to the horizontal end of the second bend and continuously horizontally extending to connect with the second inlet. The further technical feature is characterized in that an extruded product coming out of the die, along with a large amount of vapor, is pneumatically conveyed to next process. Because such a working condition is in negative pressure, the leakage of on-site vapor is avoided. In addition, since the granules do not fall freely but are pneumatically conveyed, the granules do not touch each other, and the problems of granule deformation and adhesion are not produced.

The objectives of the invention are to provide a novel extruder with non-stop die change device aiming at the deficiencies of the prior art, and the excellent effects of the invention are verified through relevant test data, in which the product variety can be changed without stop, and if a die is blocked, the extruder also does not need to stop for replacing a new die. After the application of the present technology, the production efficiency of the extrusion production line can be improved from current 56-60% to 80% or above, that is, the production efficiency of the extrusion production line is greatly improved. In addition, the problems of pollution of water vapor to the environment and granule adhesion caused by condensed water are also well solved, and the adhered granules are thoroughly avoided from original 2-5%.

These and other aspects of the invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
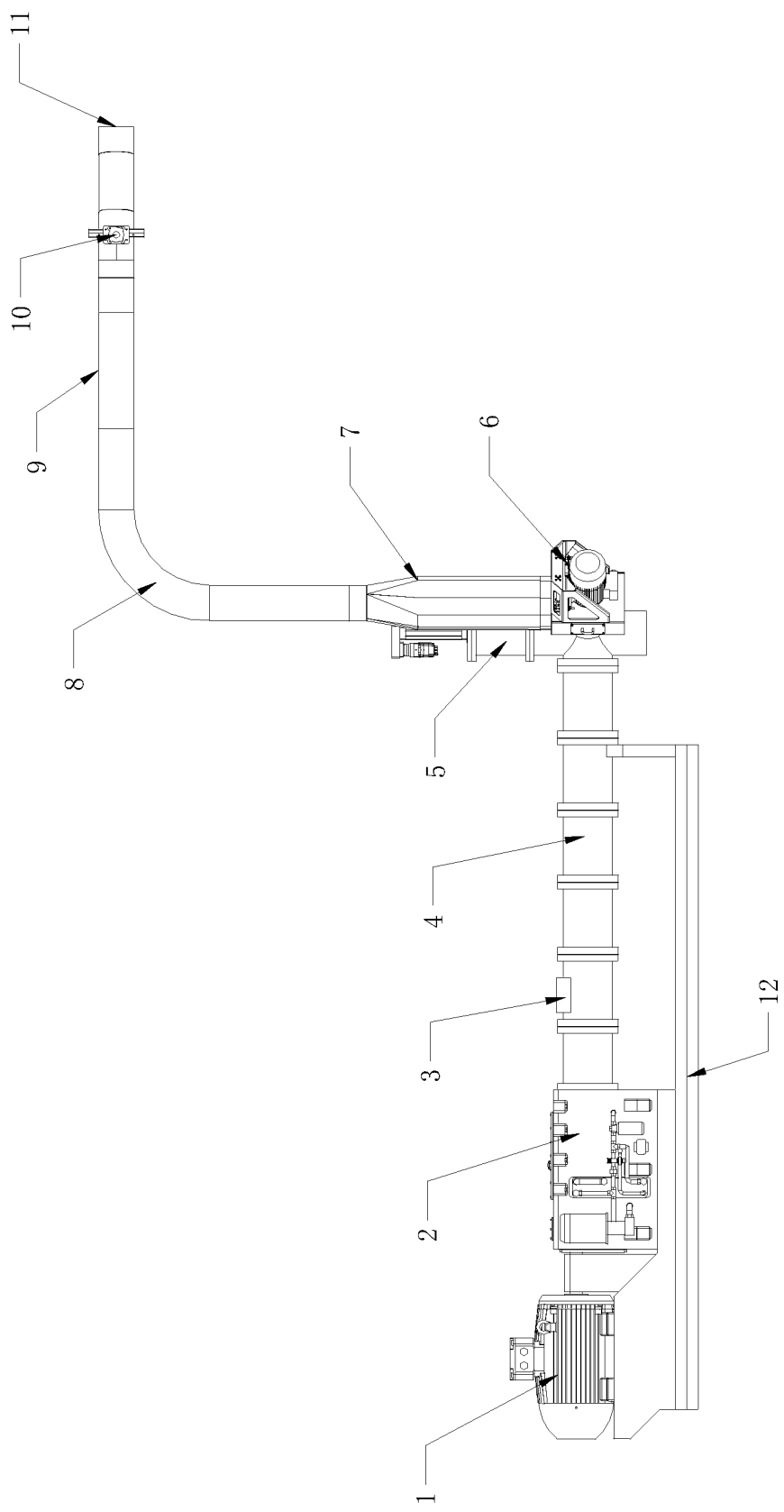
FIG. 1 is a side view of an extruder with the non-stop die change device according to Embodiment 1 of the invention.
Figure 2:
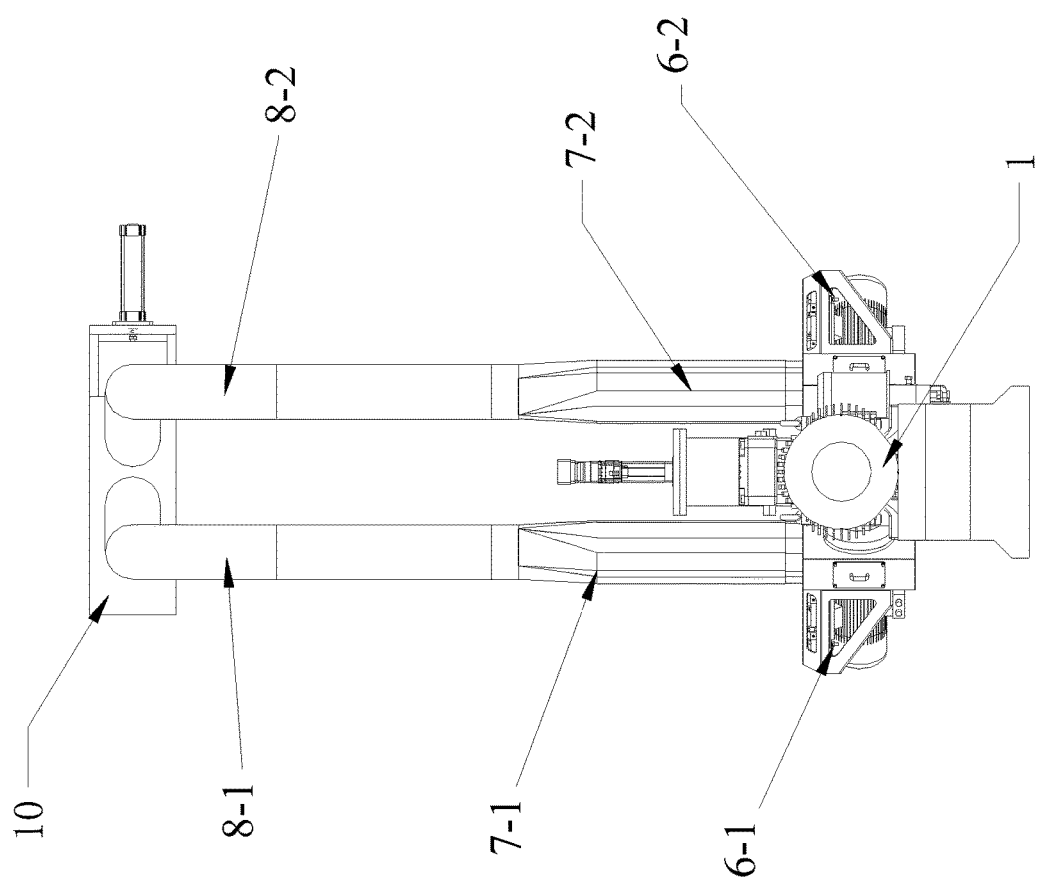
FIG. 2 is an inlet view of the extruder with the non-stop die change device according to Embodiment 1 of the invention.
Figure 3:
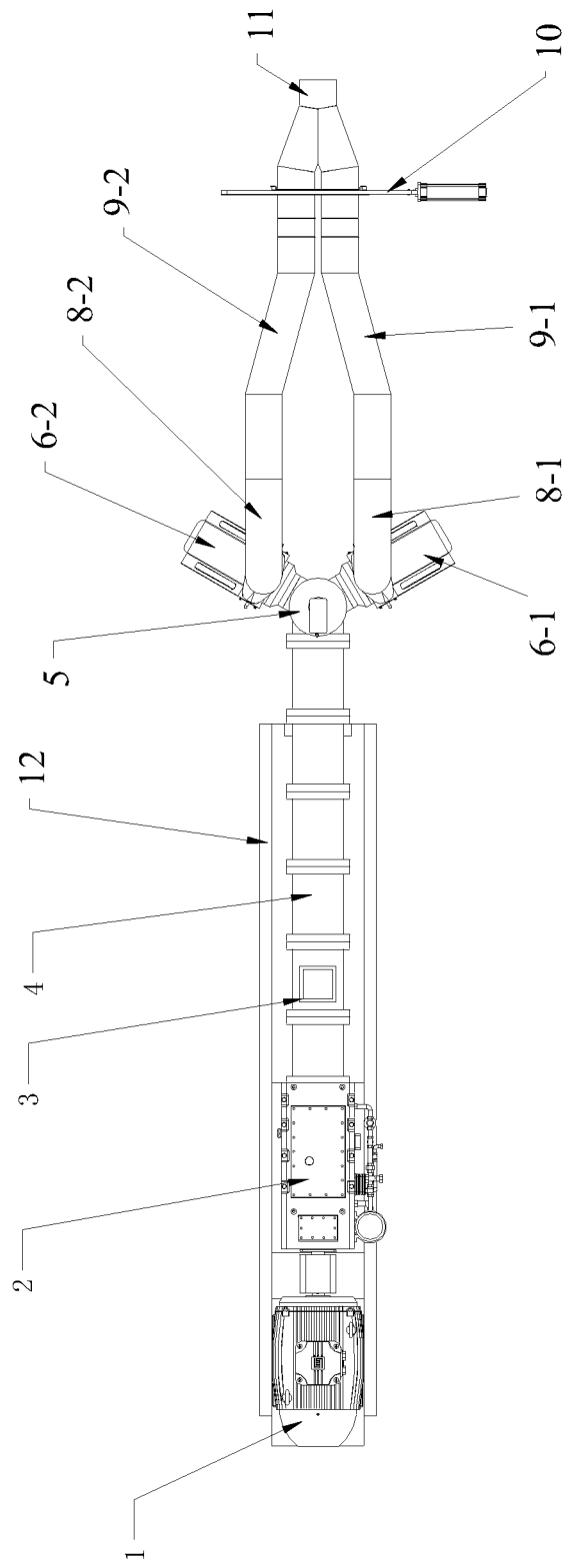
FIG. 3 is a top view of the extruder with the non-stop die change device according to Embodiment 1 of the invention.
Figure 4:
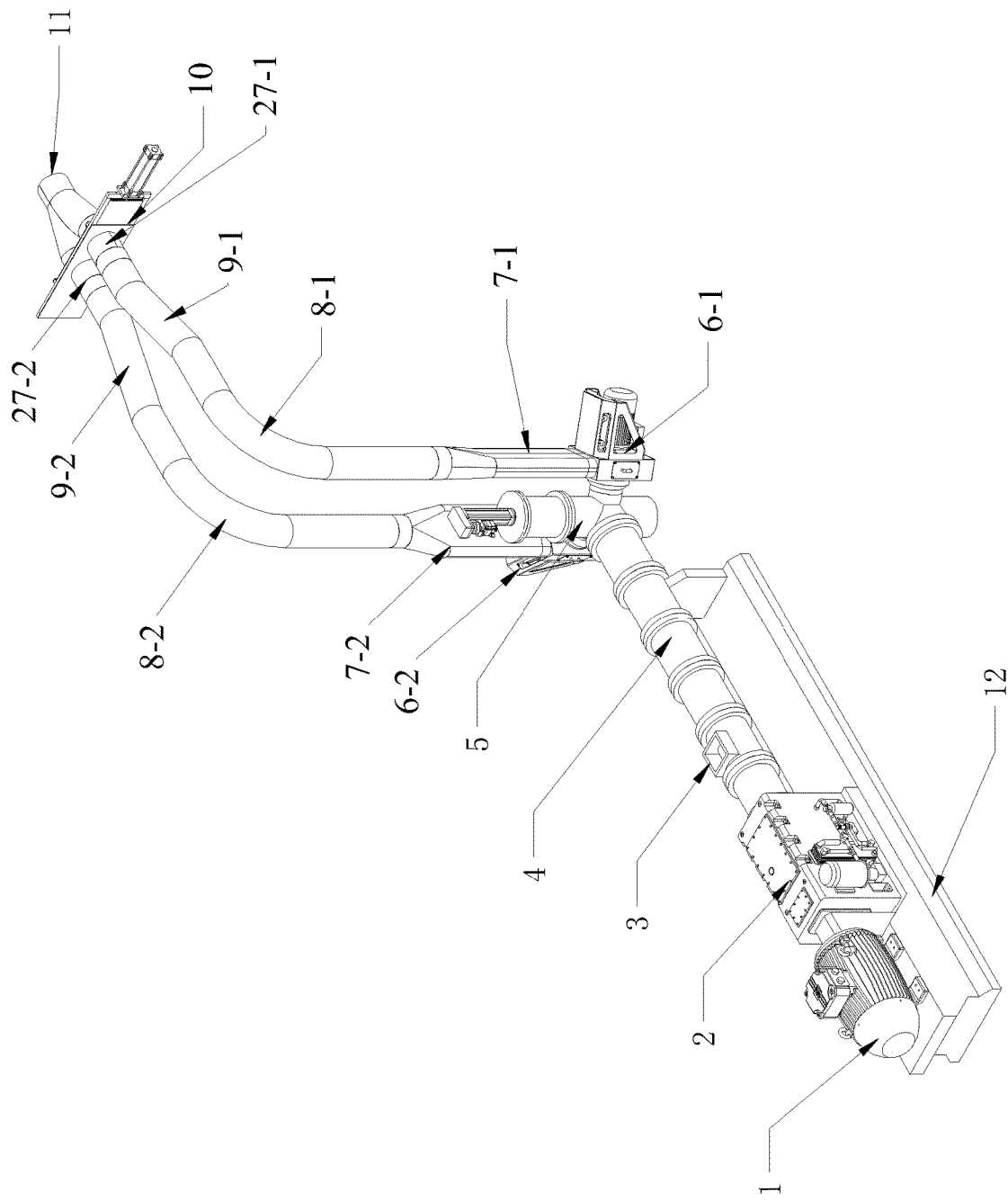
FIG. 4 is a three-dimensional view of the extruder with the non-stop die change device according to Embodiment 1 of the invention.
Figure 5:
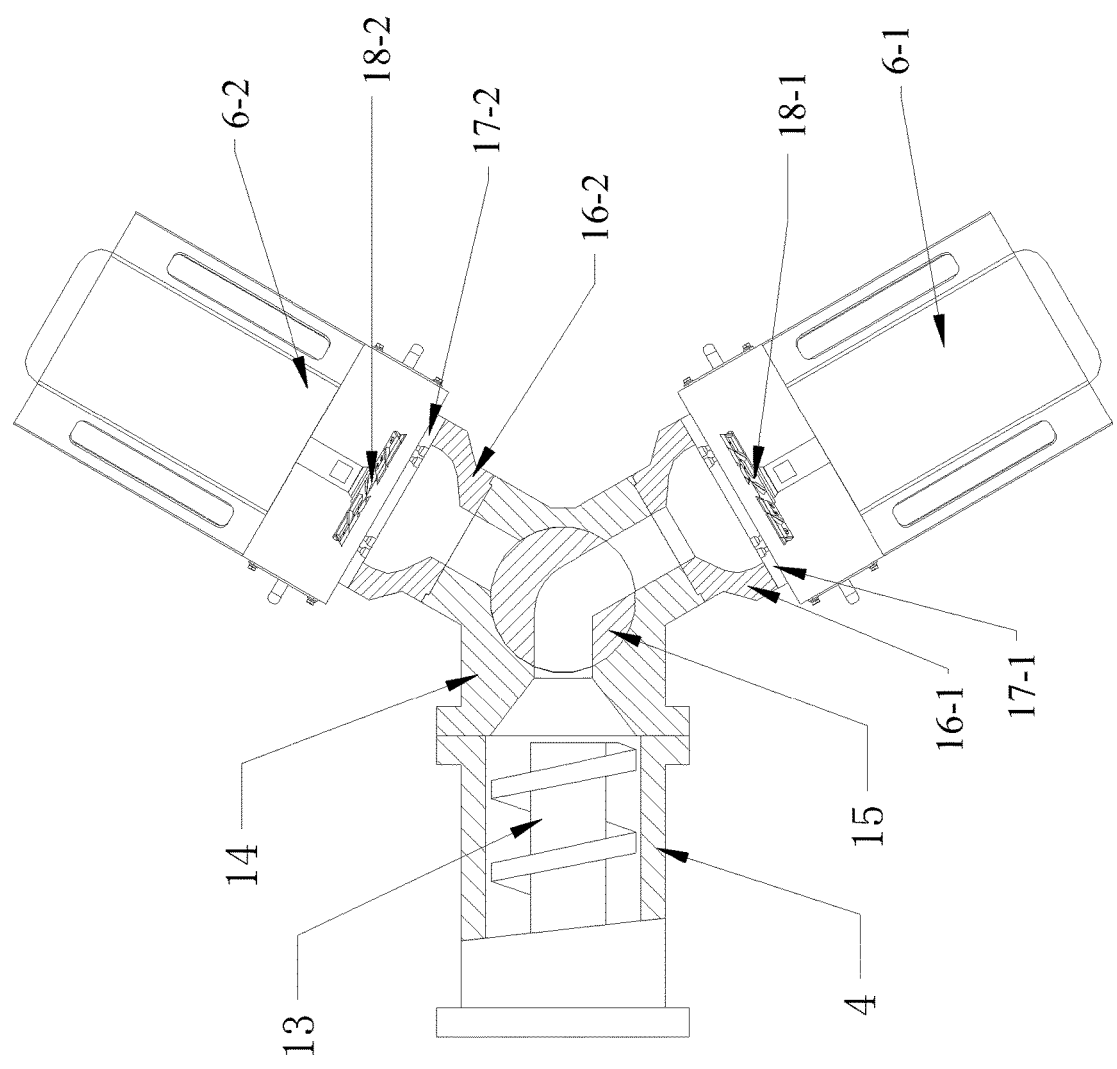
FIG. 5 is a sectional view of a die change device part of the extruder with the non-stop die change device according to Embodiment 1 of the invention.
Figure 6:
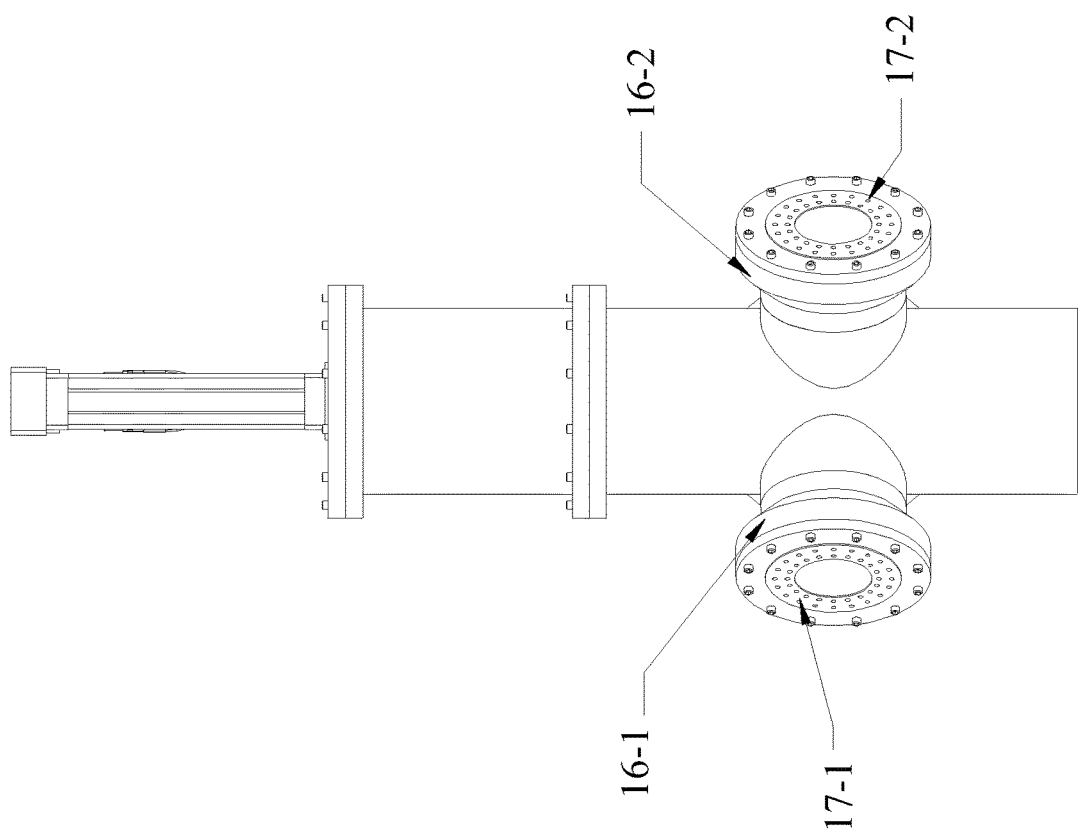
FIG. 6 is a front view of the die change device of the extruder with the non-stop die change device according to Embodiment 1 of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the phrase "at least one of A, B, and C" should be construed to mean a logical (A or B or C), using a non-exclusive logical OR.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. It should be understood that one or more steps within a method may be executed in different order (or concurrently) without altering the principles of the invention.

Embodiments of the invention are illustrated in detail hereinafter with reference to accompanying drawings. For purposes of clarity, the same reference numbers will be used in the drawings to identify similar elements.

Embodiment 1

FIGS. 1-21 show a first embodiment (i.e., Embodiment 1) of an extruder with the non-stop die change device according to the invention.

Referring to FIGS. 1-14, in Embodiment 1, an extruder includes a base 12 for supporting the entire extruder, and a motor 1 directly connected with the base 12. The motor is directly connected with a gearbox 2. The gearbox 2 is connected with a long housing-shaped multi-section extrusion cavity 4. A feed extrusion cavity 3 is provided near the start position of the extrusion cavity. A conveyor in the feed extrusion cavity 3 is a screw rod 13, and the gearbox 2 and the motor 1 drive the screw rod to rotate. The tail end of the extrusion cavity is connected with a die change mechanism 5, which includes two dies: a die A 17-1 and a die B 17-2. The die A and the die B are connected with a cutting device A 6-1 and a cutting device B 6-2, respectively.

The cutting device A 6-1 is connected with a sealed vertical air duct 7-1 installed at the upper part thereof, then the vertical air duct 7-1 is connected with a bend 8-1, and the bend 8-1 is connected with a horizontal air duct 9-1 afterwards.

The cutting device B 6-2 is connected with a sealed vertical air duct 7-2 installed at the upper part thereof, then the vertical air duct 7-2 is connected with a bend 8-2, and the bend 8-2 is connected with a horizontal air duct 9-2 afterwards.

The horizontal air ducts 9-1 and 9-2 are respectively connected with an inlet A 27-1 and an inlet B 27-2 of a three-way valve 10.

Figure 7:
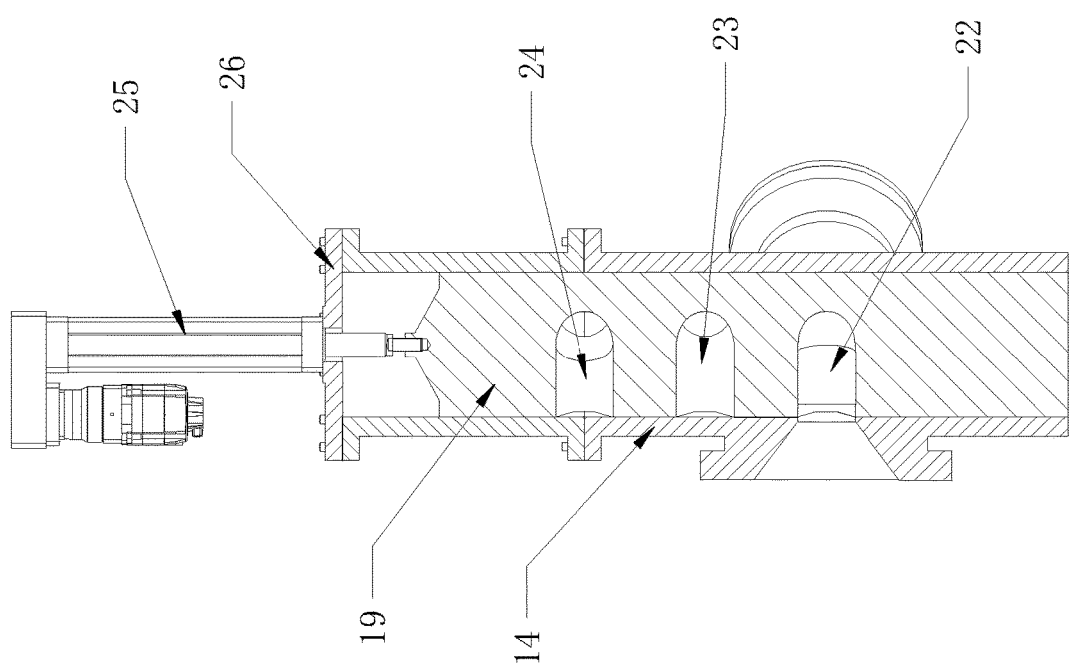
FIG. 7 is a longitudinal sectional view of the die change device in FIG. 6 and shows the working state of die A.
Figure 8:
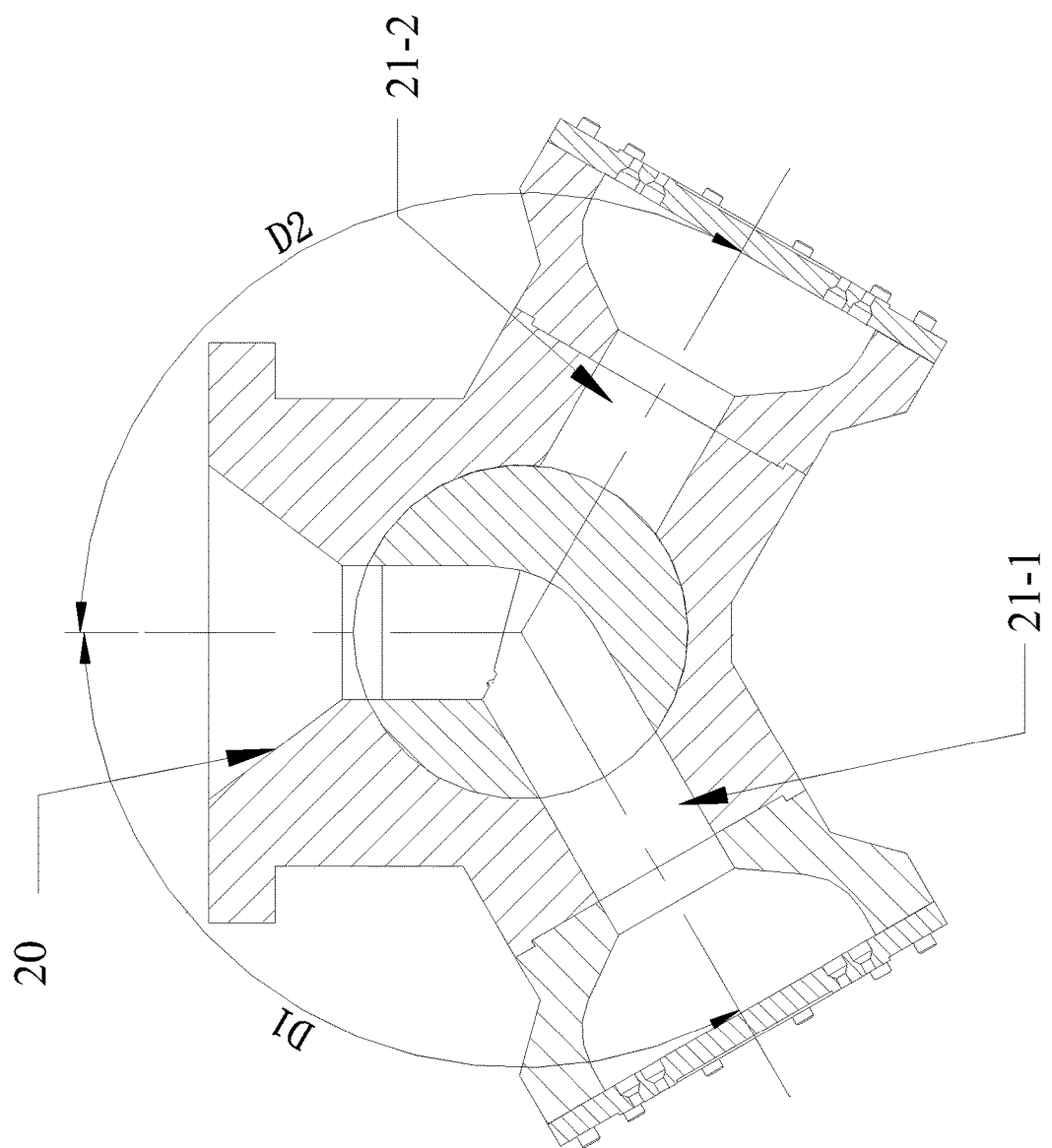
FIG. 8 is a transverse sectional view of the die change device in FIG. 6 and shows the working state of die A.
Figure 9:
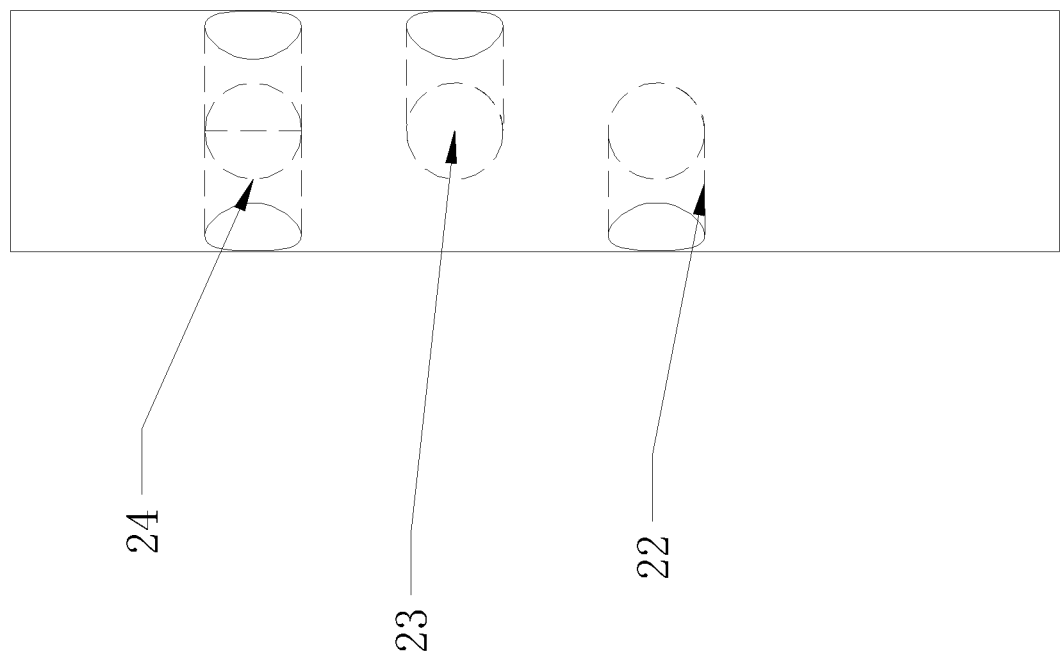
FIG. 9 is a structure diagram of a piston according to Embodiment 1 of the invention and shows a 2-position die change+1-position dual die piston.

In combination with FIGS. 7 and 8, the die change mechanism 5 includes a vertical long housing-shaped housing 14, a piston 19 is vertically placed in the housing 14, the top of the piston 19 is connected with a driving device 25, the driving device 25 is installed on a top plate 26, and the top plate 26 is directly connected with the housing 14.

The housing 14 includes a feeding port 20, a discharging port A 21-1 and a discharging port B 21-2. The included angle D1 between the centerline of the feeding port 20 and the centerline of the discharging port A is about 60°-160°, preferably about 90°-125°. The included angle D2 between the centerline of the feeding port 20 and the centerline of the discharging port B is about 60°-160°, preferably about 90°-125°.

The discharging port A is connected with a shunt 16-1, and the shunt 16-1 is connected with the die A 17-1. The die A 17-1 is connected with the cutting device A 6-1 afterwards. The cutting device A includes a cutter A 18-1.

The discharging port B is connected with a shunt 16-2, and the shunt 16-2 is connected with the die B 17-2. The die B 17-2 is connected with the cutting device B 6-2 afterwards. The cutting device B includes a cutter B 18-1.

The piston 19 can reciprocate up and down according to the action of the driving device 25 in the housing at the speed of about 0.002-20 m/s, preferably about 0.01-0.1 m/s. During operation of the extruder, the piston 19 can stay at any position inside the housing as required.

In combination with FIGS. 7-13, the piston 19 includes a plurality of channels arranged at different positions above and below, each channel includes a feeding port and one or two discharging ports. A channel A 22 is connected with the discharging port A 21-1, a channel B is connected with the discharging port B 21-2, and a dual channel 24 is connected with both the discharging port A 21-1 and the discharging port B 21-2. There is one or two or more channels A; there is one or two or more channels B; and there is zero or one or two or more dual channels.

In combination with FIGS. 19-21 again, the three-way valve 10 includes two inlets, an inlet A 27-1 and an inlet B 27-2, and an outlet 11. A switch plate 28 is arranged between the inlets and the outlet, and the switch plate 28 is connected with the driving device 29.

The switch plate 28 is provided with two channel ports: a channel port A 30-1 and a channel port B 30-2. When the inlet A 27-1 is used, the channel port A 30-1 on the switch plate 28 is aligned with the inlet A 27-1, and the switch plate 28 blocks the inlet B 27-2.

When the inlet A 27-1 and the inlet B 27-2 are simultaneously used, the driving device 29 drives the switch plate 28 to move forward, the channel port A 30-1 on the switch plate 28 is aligned with the inlet B 27-2, and the channel port B 30-2 on the switch plate is aligned with the inlet A 27-1.

When the inlet B is used, the driving device 29 continues to drive the switch plate 28 to move forward, the channel port B 30-2 on the switch plate 28 moves to the position of the inlet B 27-2, and the switch plate 28 blocks the inlet A 27-1.

It should be pointed out that the three-way valve 10 is preferred only in the present embodiment. Even if the three-way valve 10 is not used, and a valve is separately provided for each air duct for independent control, it does not affect the use.

The die A 17-1, or the die B 17-2, or the two dies, can be selected for production as required in the invention.

In combination with FIGS. 7 and 8, when the die A 17-1 is selected for production, the channel A 22 on the piston moves to the feeding port 20 through the action of the driving device 25, the material is extruded into the discharging port A through the channel A, and the die A is in an operation state at this time. Since the piston 19 blocks the discharging port B 21-2, there is no material at the discharging port B, and the discharging port B is in a non-operation state.

After being extruded from the die A, the material enters the cutting device A and is cut by the cutter A 18-1. The cut extruded product passes through the vertical air duct 7-1, the bend 8-1 and the horizontal air duct 9-1 upward respectively under the action of negative pressure pneumatic conveying and enters the three-way valve 10.

At this time, the channel port A 30-1 of the switch plate in the three-way valve 10 is aligned with the inlet A 27-1, and the inlet B 27-2 is blocked by the switch plate. Therefore, the negative pressure air can be transferred downward from the outlet 11 through the channel port A 30-1 all the way along the pipeline until it is delivered to the front of the die A. Ultimately, the extruded granules are driven to move up until reaching the outlet 11, and enter next process.

Figure 10:
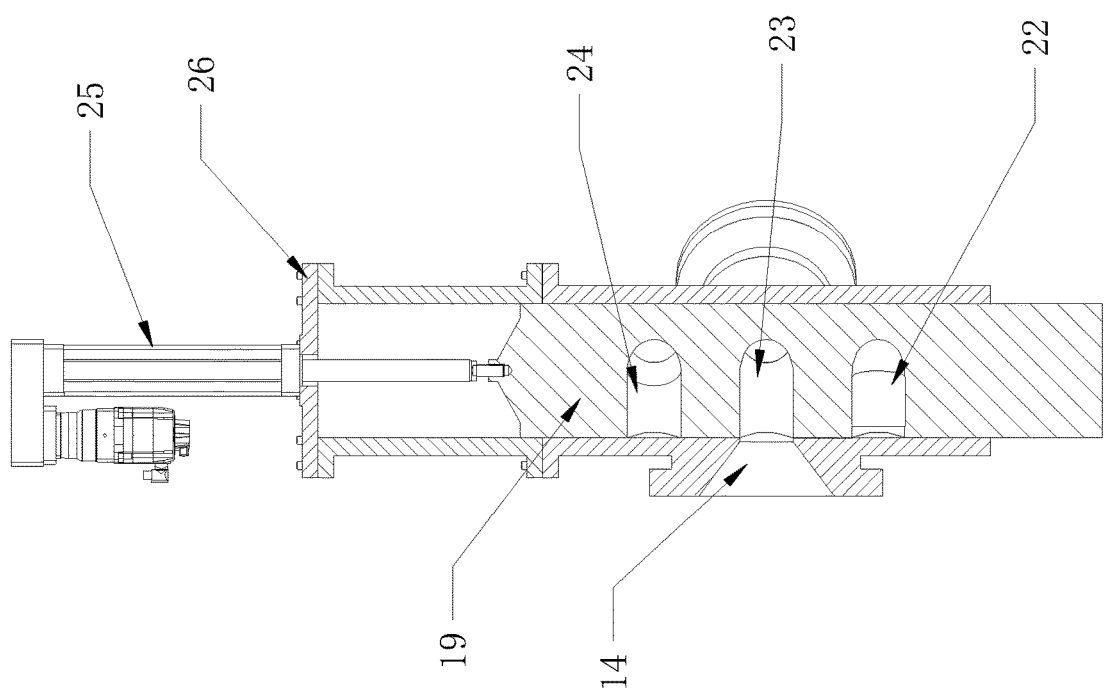
FIG. 10 is a longitudinal sectional view of the die change device in FIG. 6 and shows the working state of die B.
Figure 11:
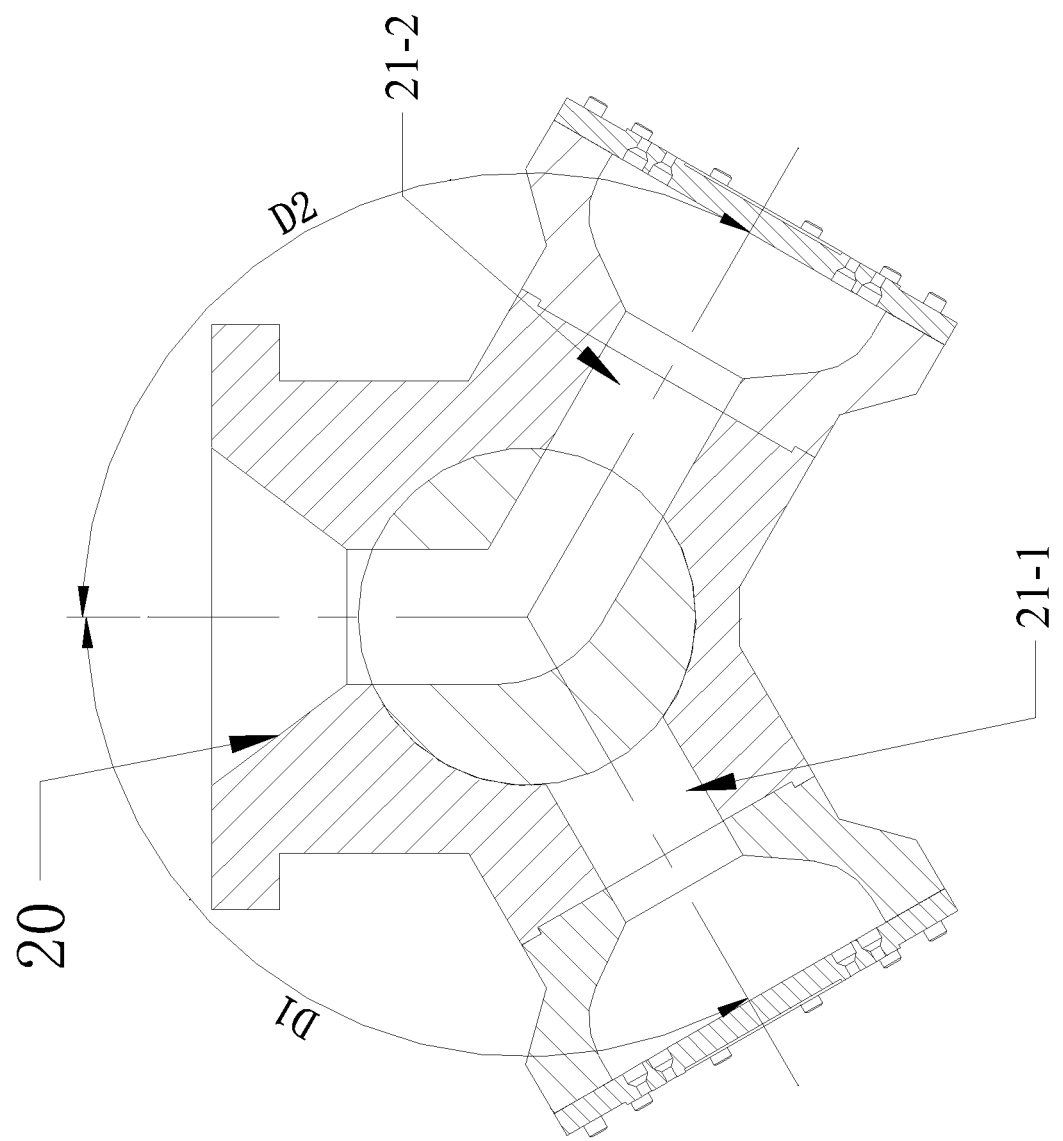
FIG. 11 is a transverse sectional view of the die change device in FIG. 6 and shows the working state of die B.

In combination with FIGS. 10 and 11, when the die B 17-2 is selected for production, the channel B 23 on the piston moves to the feeding port 20 through the action of the driving device 25 and the material is extruded into the discharging port B through the channel B, the die B is in an operation state at this time. Since the piston 19 blocks the discharging port A 21-1, there is no material at the discharging port A, and the discharging port A is in a non-operation state.

After being extruded from the die B, the material enters the cutting device B and is cut by the cutter B 18-2. The cut extruded product passes through the vertical air duct 7-2, the bend 8-2 and the horizontal air duct 9-2 upward respectively under the action of negative pressure pneumatic conveying and enters the three-way valve 10.

At this time, the channel port B 30-2 of the switch plate in the three-way valve 10 is aligned with the inlet B 27-2, and the inlet A 27-1 is blocked by the switch plate. Therefore, the negative pressure air can be transferred downward from the outlet 11 through the channel port B 30-2 all the way along the pipeline until it is delivered to the front of the die B. Ultimately, the extruded granules are driven to move up until reaching the outlet 11, and enter next process.

Figure 12:
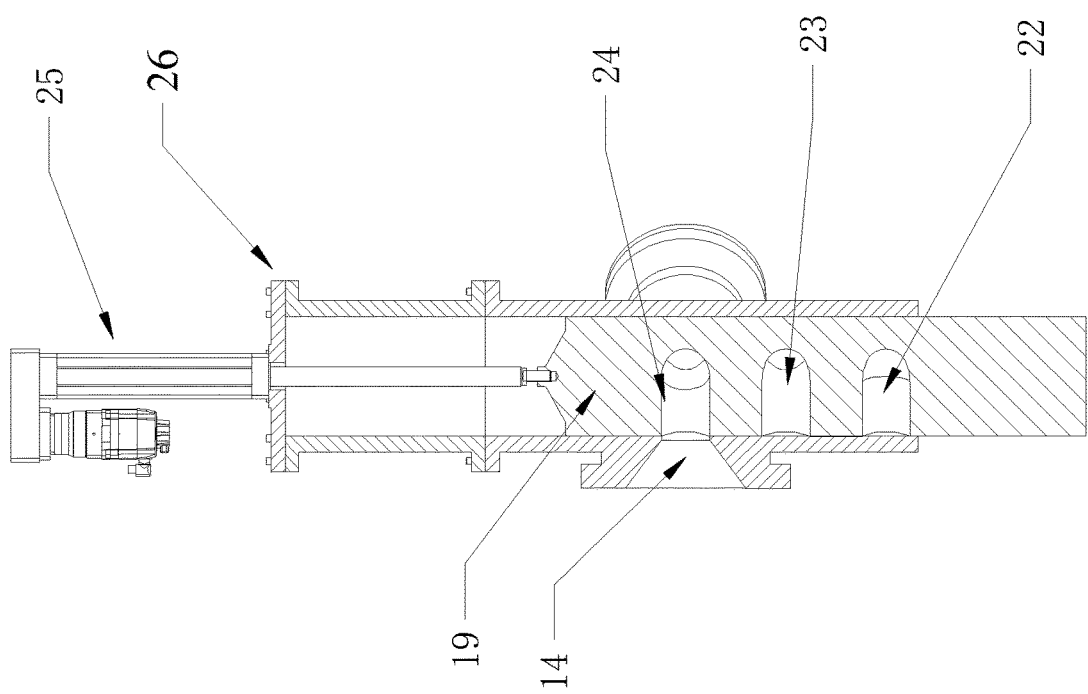
FIG. 12 is a longitudinal sectional view of the die change device in FIG. 6 and shows the state when the die A and the die B work simultaneously.
Figure 13:
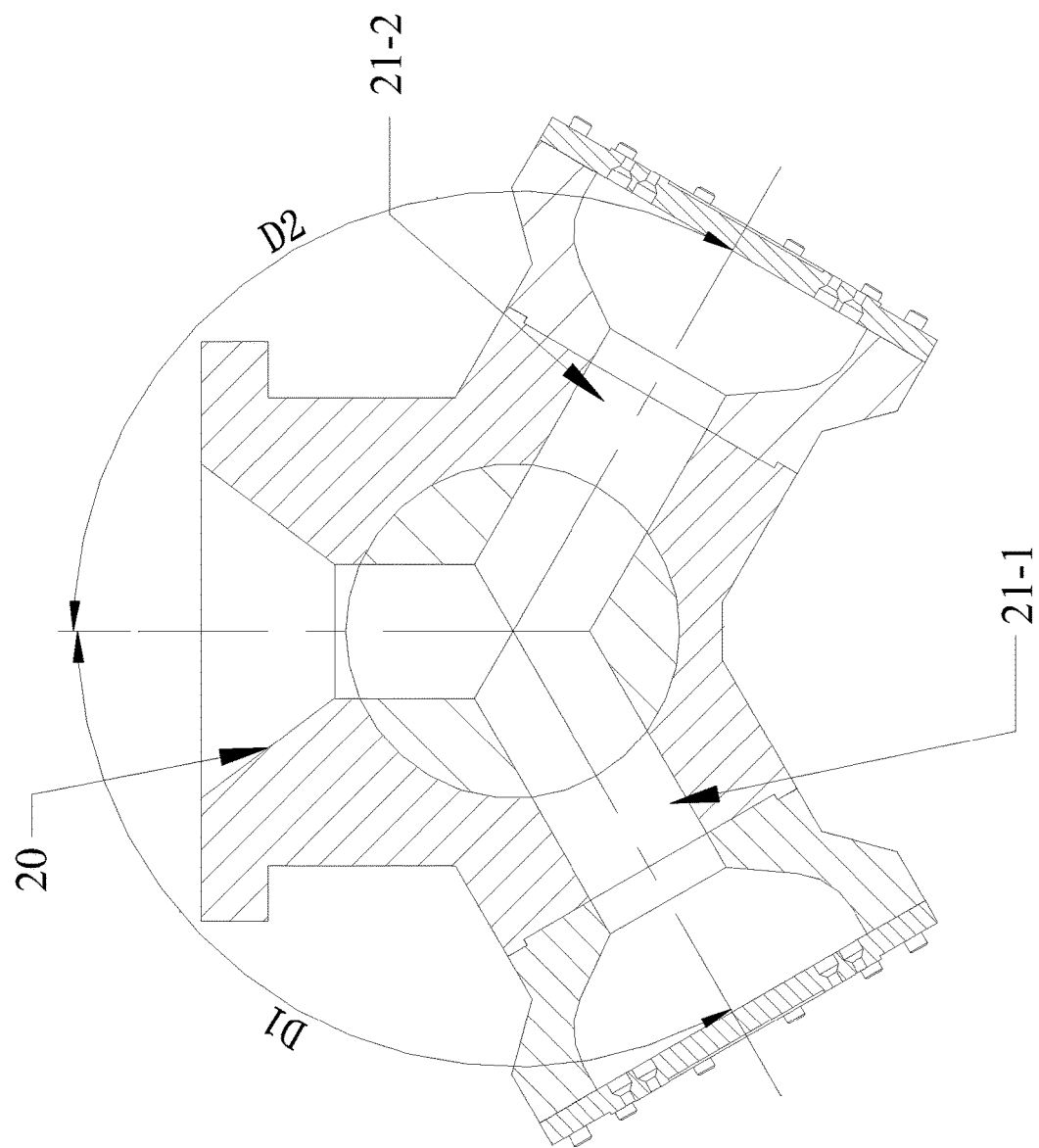
FIG. 13 is a transverse sectional view of the die change device in FIG. 6 and shows the state when the die A and the die B work simultaneously.

In combination with FIGS. 12 and 13, when the die A 17-1 and the die B 17-2 are selected for production simultaneously, the dual channel 24 on the piston moves to the feeding port 20 through the action of the driving device 25, the material is simultaneously extruded into the discharging port A and the discharging port B through the dual channel, and the die A and the die B are simultaneously in the operation state.

After being extruded from the die A, the material enters the cutting device A and is cut by the cutter A 18-1. The cut extruded product passes through the vertical air duct 7-1, the bend 8-1 and the horizontal air duct 9-1 upward respectively under the action of negative pressure pneumatic conveying and enters the three-way valve 10.

After being extruded from the die B, the material enters the cutting device B and is cut by the cutter B 18-2. The cut extruded product passes through the vertical air duct 7-2, the bend 8-2 and the horizontal air duct 9-2 upward respectively under the action of negative pressure pneumatic conveying and enters the three-way valve 10.

At this time, the channel port B 30-2 of the switch plate in the three-way valve 10 is aligned with the inlet A 27-1, and the channel port A 30-1 is aligned with the inlet B 27-2. Therefore, the negative pressure air can be transferred downward from the outlet 11 through the channel port A 30-1 and the channel port B 30-2 all the way along the pipeline until it is delivered to the front of the two dies. Ultimately, the extruded granules at the two dies are driven to move up until reaching the outlet 11, and enter next process.

The extruder with non-stop die change device in Embodiment 1 can achieve the switching among different dies in the production process.

When the die A is switched to the die B, the piston 19 moves down a certain position under the action of the driving device 25 during the production process, and the channel B 23 instead of the channel A 22 is aligned with the feeding port 20. In this way, the die A is blocked, and the die B is opened. After the material enters the die B, the cutter B runs to cut the material to obtain an extruded product. At this time, the inlet B 27-2 in the three-way valve 10 is opened, and the inlet A 27-1 is blocked.

Conversely, when the die B is switched to the die A, it is also possible.

When the die A is in production, or when the die B is in production, it can also be changed to co-production using the die A and the die B.

Figure 15:
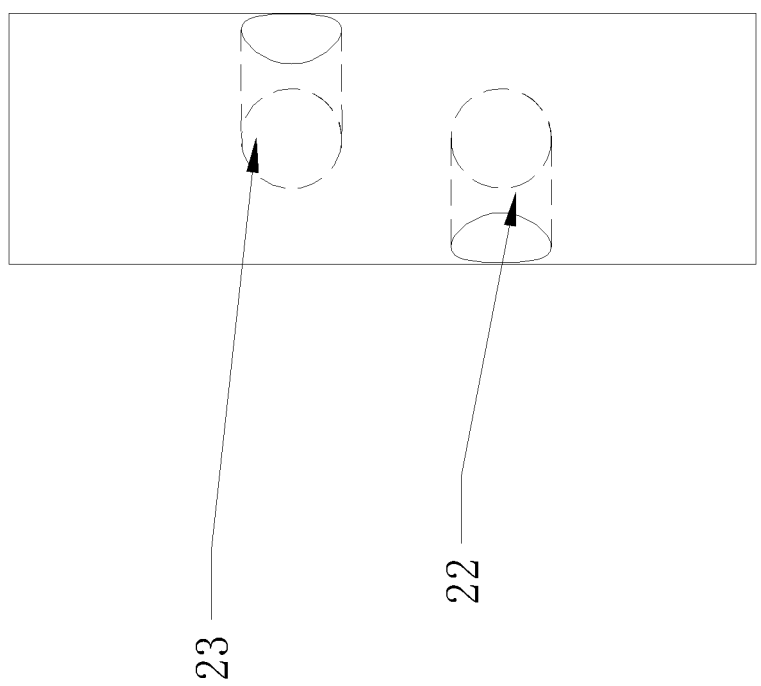
FIG. 15 is a structure diagram of a 2-position die change piston.
Figure 16:
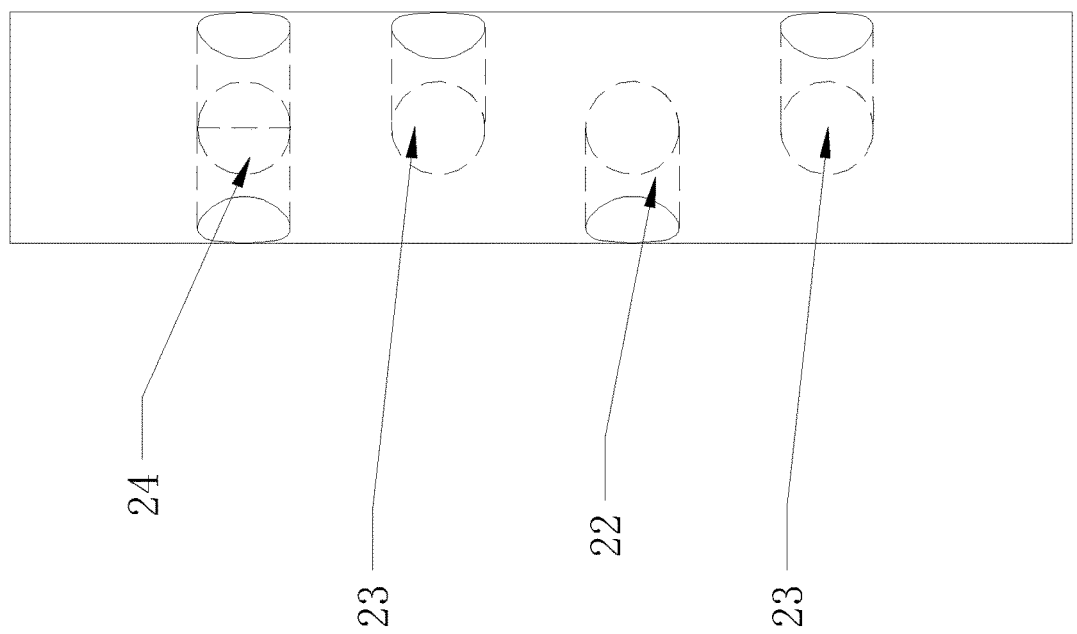
FIG. 16 is a structure diagram of a 3-position die change+1-position dual die piston.
Figure 17:
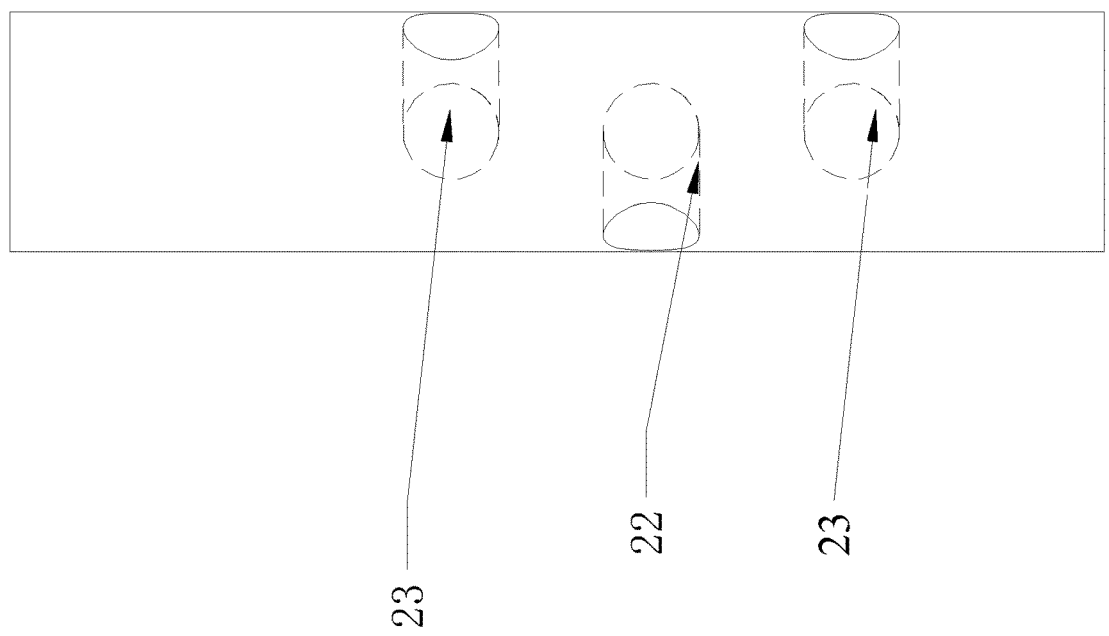
FIG. 17 is a structure diagram of a 3-position die change piston.
Figure 18:
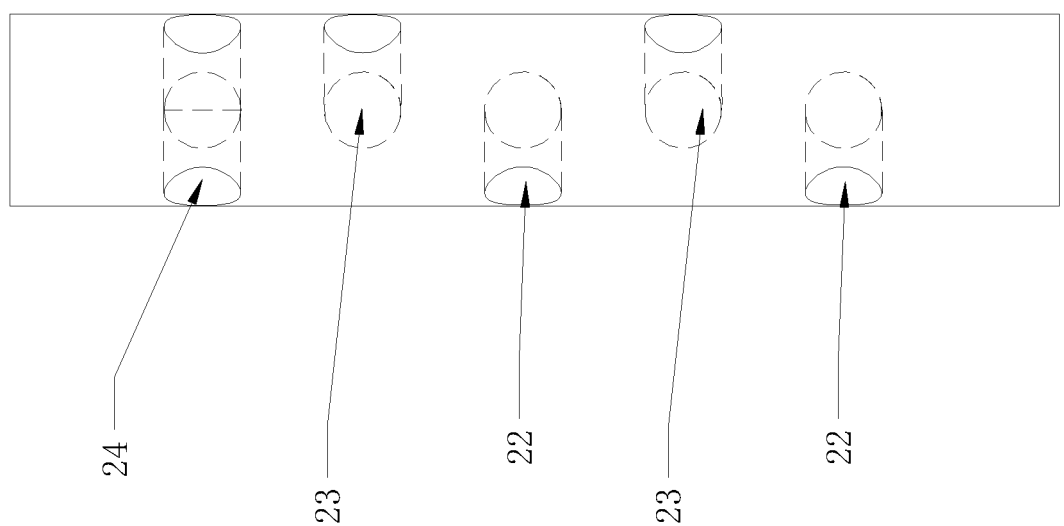
FIG. 18 is a structure diagram of a 4-position die change+1-position dual die piston.
Figure 19:
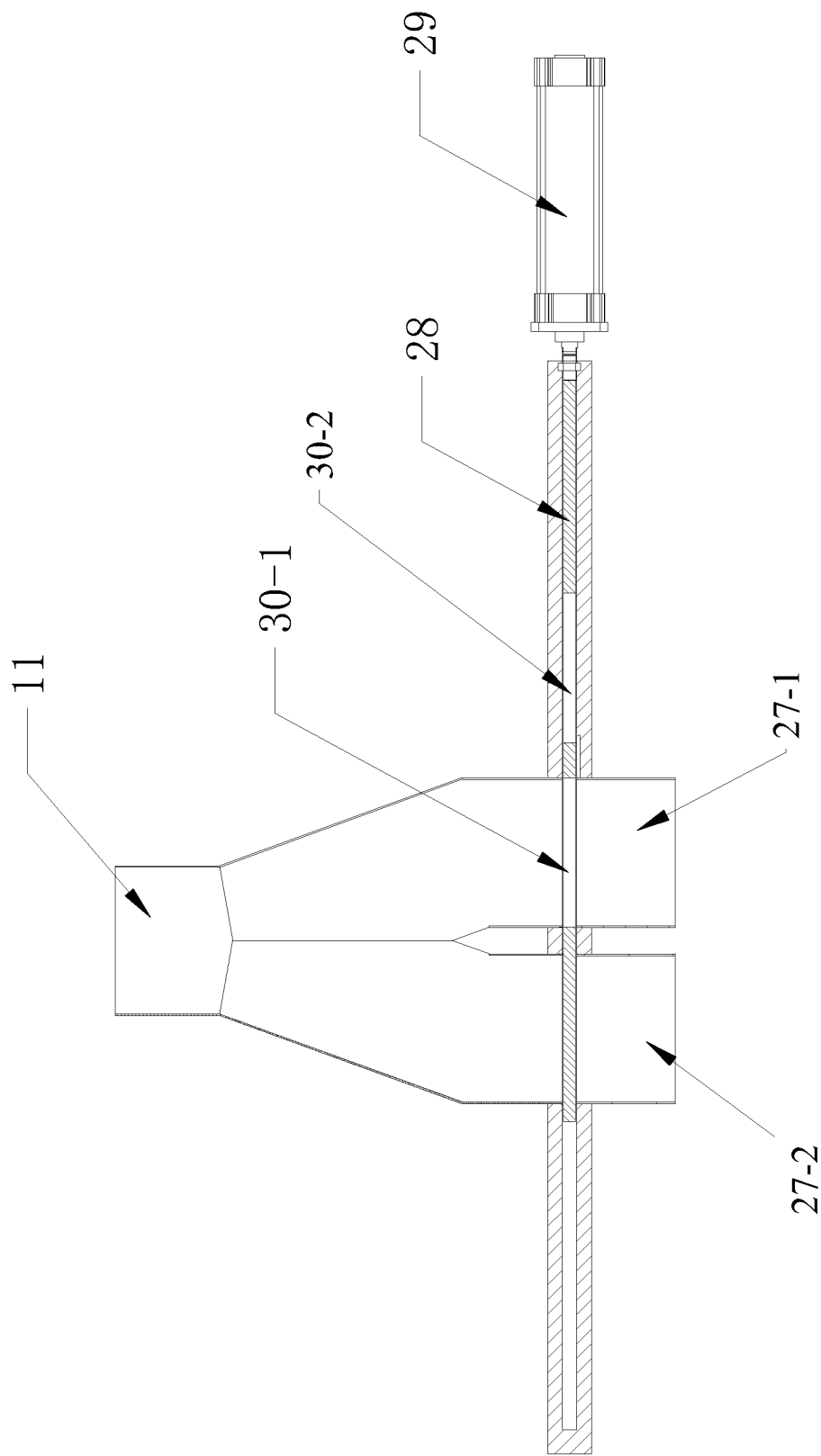
FIG. 19 is a structure diagram of a three-way valve in Embodiment 1 and shows the state of an inlet A in operation.
Figure 20:
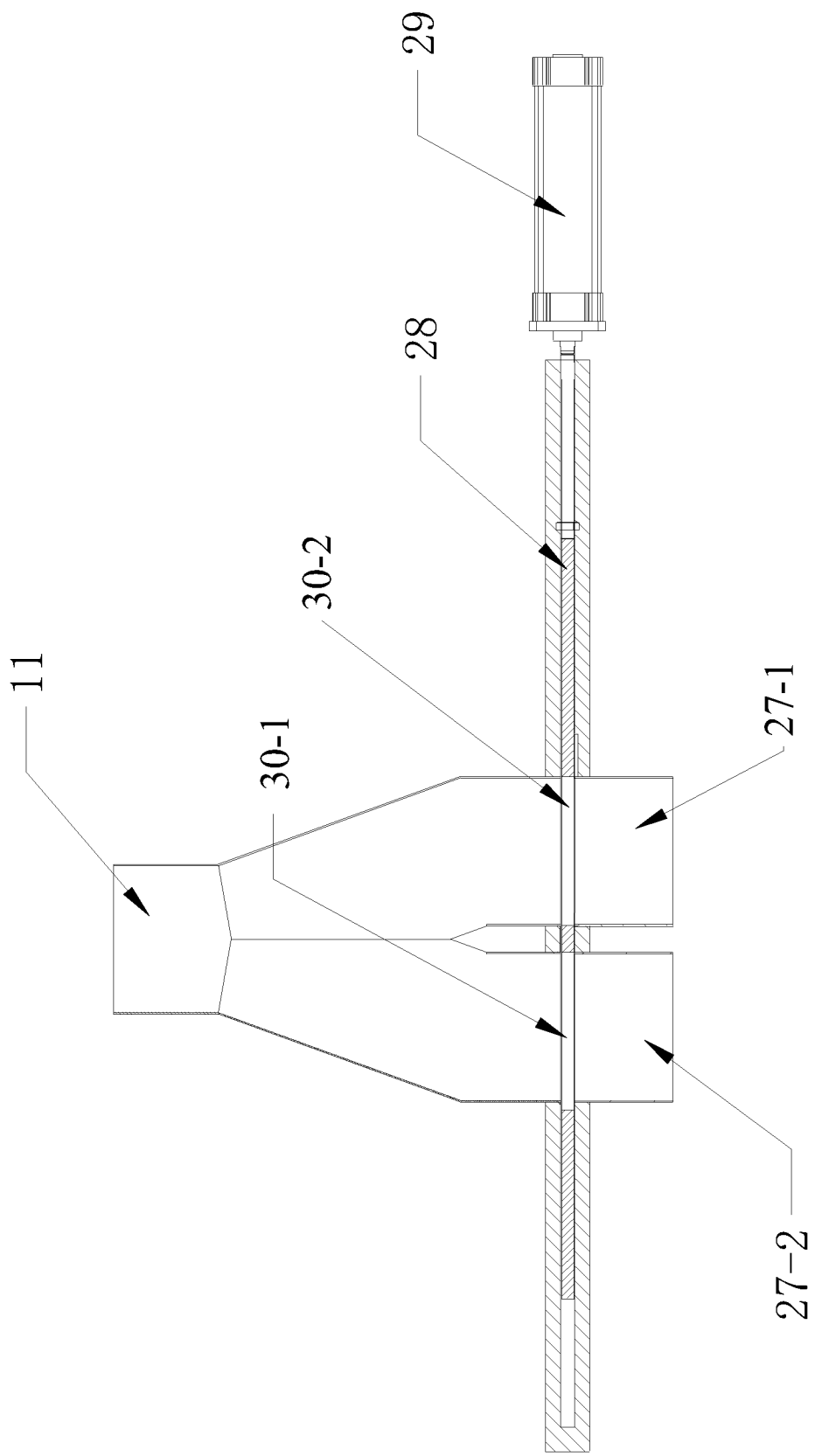
FIG. 20 is a structure diagram of a three-way valve in Embodiment 1 and shows the state of an inlet A and an inlet B in simultaneous operation.
Figure 21:
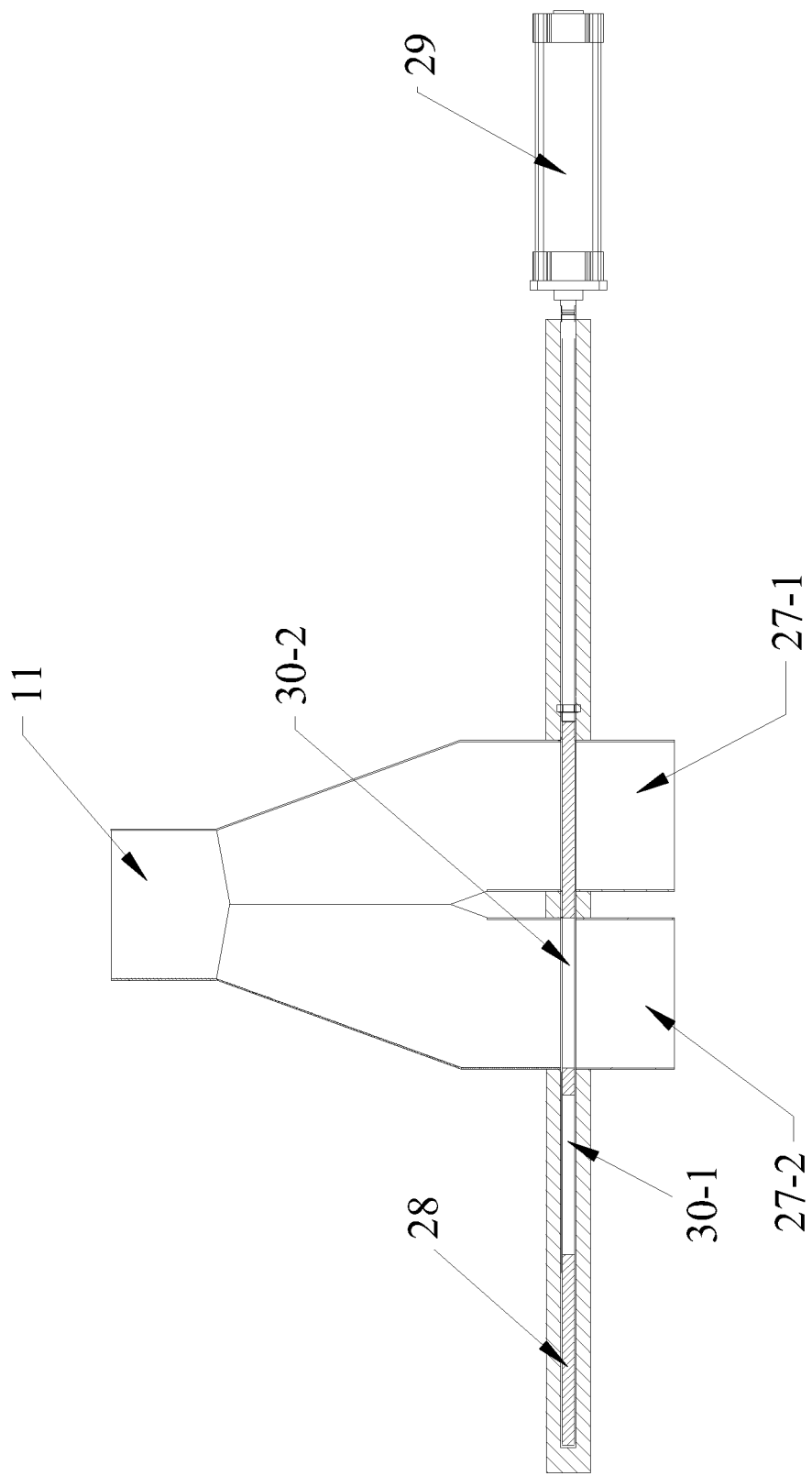
FIG. 21 is a structure diagram of a three-way valve in Embodiment 1 and shows the state of an inlet B in operation.
Figure 22:
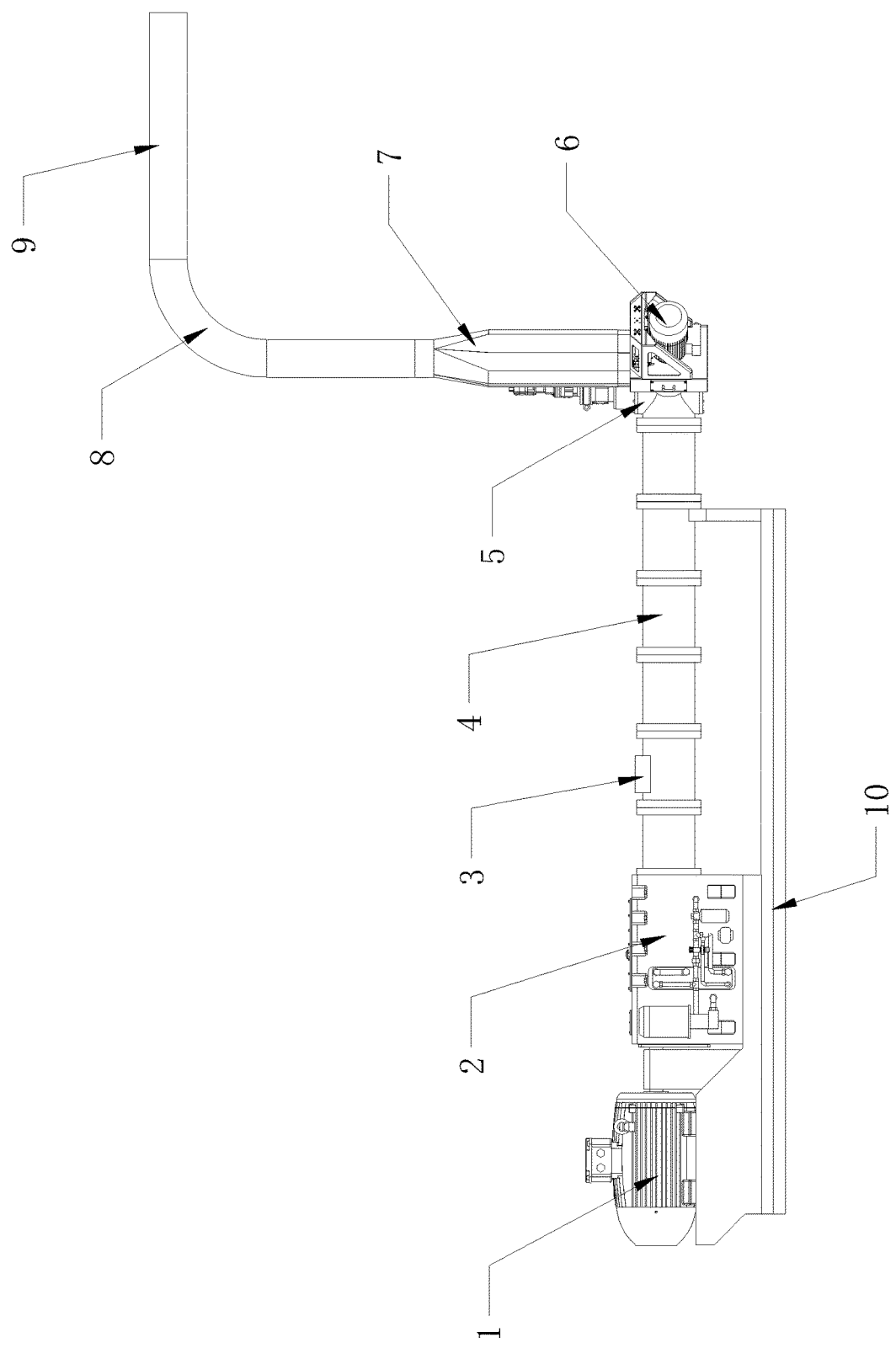
FIG. 22 is a front view of an extruder with the non-stop die change device according to Embodiment 2 of the invention.
Figure 23:
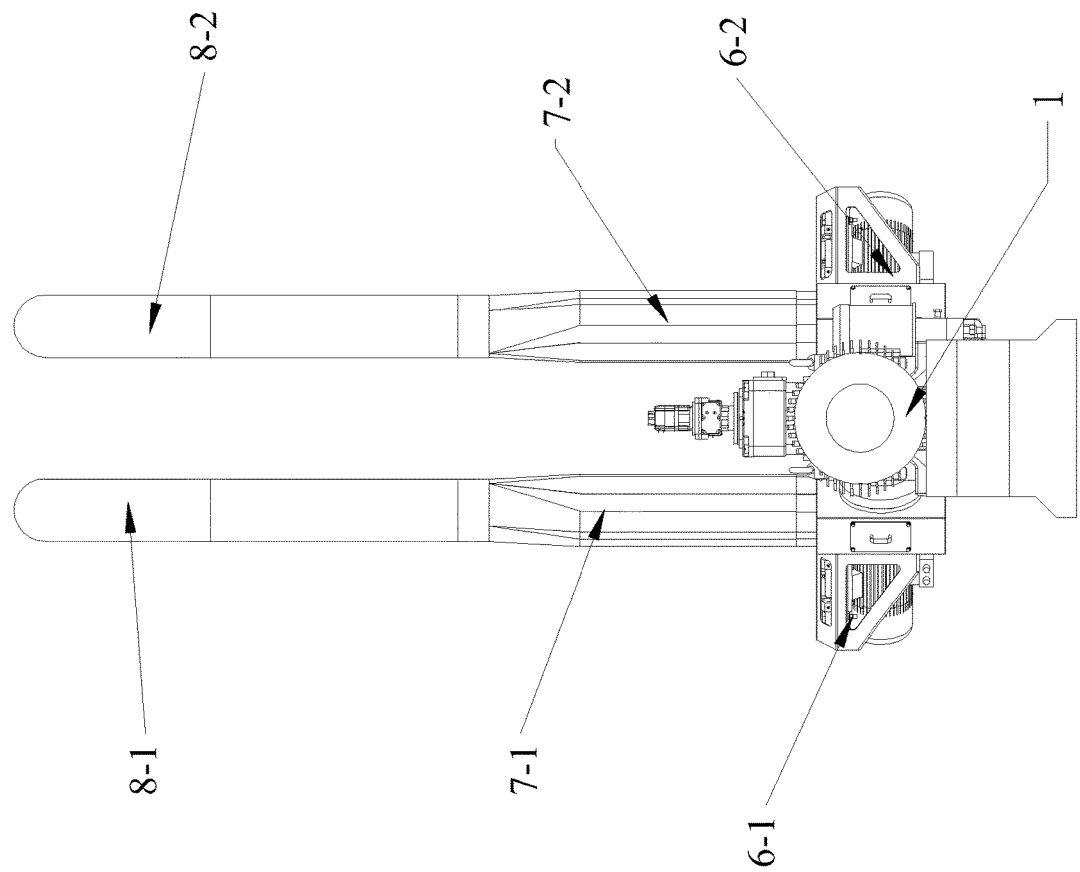
FIG. 23 is a left view of the extruder with the non-stop die change device according to Embodiment 2 of the invention.
Figure 24:
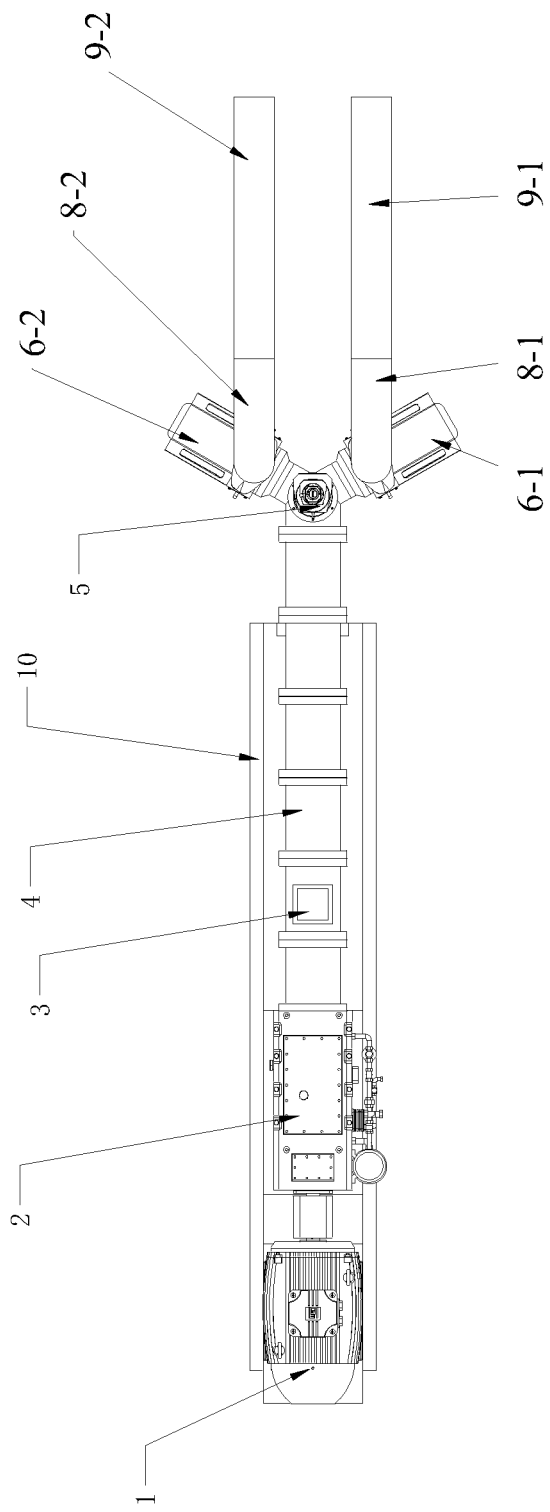
FIG. 24 is a top view of the extruder with the non-stop die change device according to Embodiment 2 of the invention.
Figure 25:
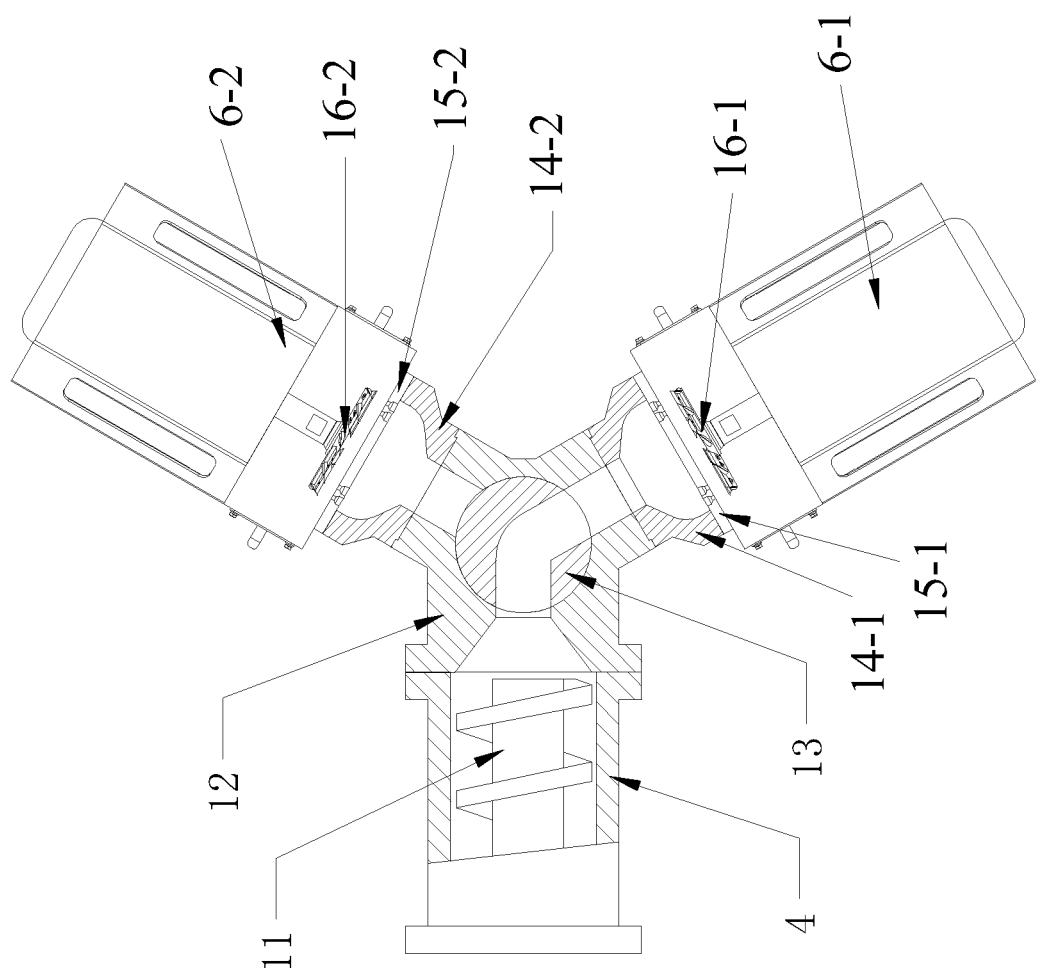
FIG. 25 is a sectional view of a die change device part of the extruder with the non-stop die change device according to Embodiment 2 of the invention.

It should be pointed out that in the present embodiment, the adopted piston is a 2-position die change+1-position dual die piston, i.e., has 3 channels, in which two channels can form die change positions with the die A and the die B respectively, and one channel communicates with the die A and the die B for use at the same time. However, based on this principle, it is not limited to only the three die change positions. FIG. 15 is a structure diagram of a 2-position die change piston, i.e., only 2 positions of the piston form die change positions with the die A and the die B, respectively, and there is no dual-die position. FIG. 16 is a structure diagram of a 3-position die change+1-position dual die piston, that is, 2 positions are die change positions where the die A or the die B can be changed, so that when one channel is blocked, other channels can replace it. Similarly, FIG. 17 is a structure diagram of a 3-position die change piston. FIG. 18 is a structure diagram of a 4-position die change+1-position dual die piston. In one embodiment, on the basis of this principle, N-position die change pistons (N is greater than 2) and N-position die change+M-position dual die pistons (N is greater than 2, M is greater than 1) are all available. Base on this, it is not limited to only two dies (die A, die B). As the size of the die change device allows, setting three or more dies in the die change device is also an implementation that can be achieved by the principle of the invention.

Figure 14:
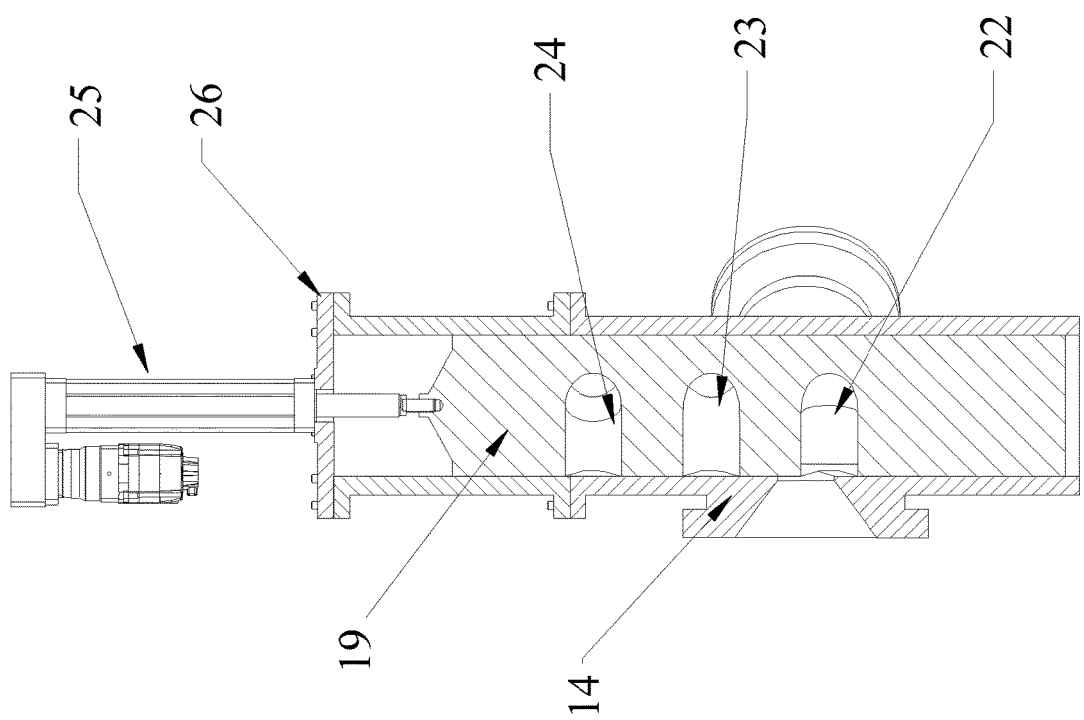
FIG. 14 is a longitudinal sectional view of the die change device in FIG. 6 and shows the state when the die A works and adjusts the mechanical energy borne by the material.

In combination with FIG. 14, the invention can control the mechanical energy during the production process. When the die A is used for production and a certain degree of misalignment is formed between the channel A 22 and the feeding port 20, the resistance of the material at this position becomes larger than that in alignment. If the degree of misalignment is larger, the resistance is larger, and the mechanical energy borne by the material is larger.

Therefore, the piston 19 can stay at different positions as needed to control the magnitude of the mechanical energy borne by the material in the extruder. The piston 19 can also be adjusted at different positions in the working state of the extruder without stop. Therefore, on-line adjustment of the mechanical energy can be realized.

Similarly, when the die B is used for production, the above function can also be realized as same as the previous die A.

Similarly, when the die A and the die B are used for production simultaneously, the above function can also be realized as same as the previous die A.

The extruder with non-stop die change device in Embodiment 1 can avoid granule adhesion, leakage of water vapor and pollution to the surrounding environment during the production process.

The extruded product coming out of the die, along with a large amount of vapor, is pneumatically conveyed to next process. Because such a working condition is in negative pressure, the leakage of on-site vapor is avoided.

In addition, since the granules do not fall freely but are pneumatically conveyed, the granules do not touch each other, and the problems of granule deformation and adhesion are not produced.

Hereinafter, the extruder in Embodiment 1 is tested to prove that the invention can achieve the declared beneficial effects.

The dies used in the test of Embodiment 1 are dies having the apertures of about 3.0 mm. The main motor load current of the extruder is 90%, and the capacity of the extruder is about 6 t/h.

The piston in the die change mechanism can reciprocate up and down in the housing under the action of the driving device. In the present embodiment, the moving speed of the piston is about 0.1 m/s. During the operation of the extruder, the piston can stay at any position inside the housing as required.

In Embodiment 1, the piston includes one channel A, one channel B and one dual channel. In Embodiment 1, the included angle D1 between the centerline of the feeding port 20 and the centerline of the discharging port A is about 120°. The included angle D2 between the centerline of the feeding port 20 and the centerline of the discharging port B is also about 120°.

When Embodiment 1 is adopted, the test formula is shown in table 1. The crushed material has such fineness that about 95% passes through a about 80-mesh sieve, about 99.5% passes through a 60-mesh sieve and 100% passes through a 50-mesh sieve. The material is first pre-cured in an ordinary conditioner. The degree of gelatinization of the material after being pre-cured in the conditioner is about 45%, the temperature of the material is 95° C., and the water content of the material is about 24%. When the material enters the extruder, it is first extruded through the die A and cut into extruded granules through the cutter A, and the extruded granules enter the inlet A 27-1 through the sealed vertical air duct and finally enter next process from the outlet 11.

TABLE 1

| Formula of material (weight percentage) | |
|---|---|
| Soybean meal | 27 |
| Wheat flour | 25 |
| Wheat bran | 18 |
| Rape seed cake | 27 |
| Grease | 3 |
| Total | 100 |

The test data in Embodiment 1 includes the following:
1. First Group of Data

1) Test whether the die A can be switched to the die B without stop, and the stable production of the extruder can also be kept after the switching;

2) Test the time length of non-stop die change, wherein the starting point of the time length is when an instruction for switching the die is transmitted to a pore subsystem during the stable production process of the die A; and the terminating point is when the die switch is completed, the die B starts stable production and a qualified expanded product can be processed;

3) Test the maximum fluctuation range of the main motor current before the switch;

4) Test the maximum fluctuation range of the main motor current in the process of switching the die;

5) Test the comparison of the extrusion coefficients of extruded granules before and after the die switch;

6) Test the comparison of the volume weights of extruded granules before and after the die switch;

7) Test the comparison of the floating rates of the product before and after the die switch;

8) Test the comparison of the length uniformity of extruded granules before and after the die switch;

9) Visually inspect whether water vapor leaks nearby the cutting device before the die switch;

10) Visually inspect whether water vapor leaks nearby the cutting device after the die switch;

11) Sample 2 kg of extruded granules before the die switch to check the number of adhered extruded granules; and 12) Sample 2 kg of extruded granules after the die switch to check the number of adhered extruded granules.

2. Second Group of Data

1) Test whether the die B can be switched to the die A without stop, and the stable production of the extruder can also be kept after the switching;

2) Test the time length of non-stop die change, wherein the starting point of the time length is when an instruction for switching the die is transmitted to a pore subsystem during the stable production process of the die B; and the terminating point is when the die switch is completed, the die A starts stable production and a qualified expanded product can be processed.

3) Test the maximum fluctuation range of the main motor current before the switch;

4) Test the maximum fluctuation range of the main motor current in the process of switching the die;

5) Test the comparison of the extrusion coefficients of extruded granules before and after the die switch;

6) Test the comparison of the volume weights of extruded granules before and after the die switch;

7) Test the comparison of the floating rates of the product before and after the die switch;

8) Test the comparison of the length uniformity of extruded granules before and after the die switch;

9) Visually inspect whether water vapor leaks nearby the cutting device before the die switch;

10) Visually inspect whether water vapor leaks nearby the cutting device after the die switch;

11) Sample 2 kg of extruded granules before the die switch to check the number of adhered extruded granules; and 12) Sample 2 kg of extruded granules after the die switch to check the number of adhered extruded granules.

3. Third Group of Data

1) Test whether the die B can be switched to simultaneous operation of the die A and the die B without stop, and the stable production of the extruder can also be kept after the switching;

2) Test the time length of non-stop die change, wherein the starting point of the time length is when an instruction for switching the die is transmitted to a pore subsystem during the stable production process of the die B; and the terminating point is when the die switch is completed, the die A starts stable production and a qualified expanded product can be processed.

3) Test the maximum fluctuation range of the main motor current before the switch;

4) Test the maximum fluctuation range of the main motor current in the process of switching the die;

5) Test the comparison of the extrusion coefficients of extruded granules before and after the die switch;

6) Test the comparison of the volume weights of extruded granules before and after the die switch;

7) Test the comparison of the floating rates of the product before and after the die switch;

8) Test the comparison of the length and uniformity of extruded granules before and after the die switch;

9) Visually inspect whether water vapor leaks nearby the cutting device before the die switch;

10) Visually inspect whether water vapor leaks nearby the cutting device after the die switch;

11) Sample 2 kg of extruded granules before the die switch to check the number of adhered extruded granules; and 12) Sample 2 kg of extruded granules after the die switch to check the number of adhered extruded granules.

4. Fourth Group of Data

1) During the production process of the die A, adjust the mechanical energy, adjust the channel misalignment to about 20%, and check the change of volume weight;

2) During the production process of the die A, adjust the mechanical energy, adjust the channel misalignment to about 30%, and check the change of volume weight;

3) During the production process of the die A, adjust the mechanical energy, adjust the channel misalignment to about 40%, and check the change of volume weight;

4) During the production process of the die B, adjust the mechanical energy, adjust the channel misalignment to about 20%, and check the change of volume weight;

5) During the production process of the die B, adjust the mechanical energy, adjust the channel misalignment to about 30%, and check the change of volume weight;

6) During the production process of the die B, adjust the mechanical energy, adjust the channel misalignment to about 40%, and check the change of volume weight;

7) During the co-production process of the die A and the die B, adjust the mechanical energy, adjust the channel misalignment to about 20%, and check the change of volume weight;

8) During the co-production process of the die A and the die B, adjust the mechanical energy, adjust the channel misalignment to about 30%, and check the change of volume weight; and 9) During the co-production process of the die A and the die B, adjust the mechanical energy, adjust the channel misalignment to about 40%, and check the change of volume weight.

TABLE 2

Switch die A to die B

| No. | Test items | Data |
|---|---|---|
| 1 | Time length of non-stop die change | 15 s |
| 2 | Maximum current fluctuation before the switch | ±8 A |
| 3 | Maximum current fluctuation during the switch | ±12 A |
| 4 | Maximum current fluctuation after the switch | ±9 A |
| 5 | Extrusion coefficient of granules before the switch | 1.7 |
| 6 | Extrusion coefficient of granules after the switch | 1.7 |
| 7 | Volume weight of granules before the switch | 346 g/l |
| 8 | Volume weight of granules after the switch | 340 g/l |
| 9 | Floating rate of granules before the switch | 100% float |
| 10 | Floating rate of granules after the switch | 100% float |
| 11 | Maximum length difference of granules before the switch | ±0.21 mm |
| 12 | Maximum length difference of granules after the switch | ±0.23 mm |
| 13 | Whether vapor leaks nearby the cutting device before cutting | No |
| 14 | Whether vapor leaks nearby the cutting device after cutting | No |
| 15 | Sample 2 kg of extruded granules before the die switch to check the number of adhered extruded granules | No |
| 16 | Sample 2 kg of extruded granules after the die switch to check the number of adhered extruded granules | No |

It can be obtained by analysis based on the above test data that the technical application case of the invention can realize non-stop switch from the die A to the die B within a short time. At the same time, the data does not fluctuate greatly during and after the switching, and the quality of the product before and after the switch can be kept consistent.

TABLE 3

Switch die B to die A

| No. | Test items | Data |
|---|---|---|
| 1 | Time length of non-stop die change | 15 s |
| 2 | Maximum current fluctuation before the switch | ±7 A |
| 3 | Maximum current fluctuation during the switch | ±13 A |
| 4 | Maximum current fluctuation after the switch | ±10 A |
| 5 | Extrusion coefficient of granules before the switch | 1.7 |
| 6 | Extrusion coefficient of granules after the switch | 1.7 |
| 7 | Volume weight of granules before the switch | 341 g/l |
| 8 | Volume weight of granules after the switch | 344 g/l |
| 9 | Floating rate of granules before the switch | 100% float |
| 10 | Floating rate of granules after the switch | 100% float |
| 11 | Maximum length difference of granules before the switch | ±0.19 mm |
| 12 | Maximum length difference of granules after the switch | ±0.21 mm |
| 13 | Whether vapor leaks nearby the cutting device before cutting | No |
| 14 | Whether vapor leaks nearby the cutting device after cutting | No |
| 15 | Sample 2 kg of extruded granules before the die switch to check the number of adhered extruded granules | No |
| 16 | Sample 2 kg of extruded granules after the die switch to check the number of adhered extruded granules | No |

It can be obtained by analysis based on the above test data that the technical application case of the invention can realize non-stop switch from the die B to the die A within a short time. At the same time, the data does not fluctuate greatly during and after the switching, and the quality of the product before and after the switch can be kept consistent.

TABLE 4

Switch die B to simultaneous operation of die A and die B

| No. | Test items | Data |
|---|---|---|
| 1 | Time length of non-stop die change | 15 s |
| 2 | Maximum current fluctuation before the switch | ±8 A |
| 3 | Maximum current fluctuation during the switch | ±9 A |
| 4 | Maximum current fluctuation after the switch | ±10 A |
| 5 | Extrusion coefficient of granules before the switch | 1.7 |
| 6 | Extrusion coefficient of granules after the switch | 1.15 |
| 7 | Volume weight of granules before the switch | 347 g/l |
| 8 | Volume weight of granules after the switch | 725 g/l |
| 9 | Floating rate of granules before the switch | 100% float |
| 10 | Floating rate of granules after the switch | 100% sink |
| 11 | Maximum length difference of granules before the switch | ±0.17 mm |
| 12 | Maximum length difference of granules after the switch | ±0.23 mm |
| 13 | Whether vapor leaks nearby the cutting device before cutting | No |
| 14 | Whether vapor leaks nearby the cutting device after cutting | No |
| 15 | Sample 2 kg of extruded granules before the die switch to check the number of adhered extruded granules | No |
| 16 | Sample 2 kg of extruded granules after the die switch to check the number of adhered extruded granules | No |

It can be obtained by analysis based on the above test data that the technical application case of the invention can realize non-stop switch from the die B to simultaneous operation of the die A and the die B within a short time. Floating granules with low volume weight are produced before the switch, and 100% sinking granules are produced after the switching due to the increase of area of the dies. However, the difference in the granule length of the product remains unchanged.

TABLE 5

Mechanical energy adjustment test data

| No. | Test items | Volume weight of granules |
|---|---|---|
| 1 | Adjust the channel misalignment to 0% during the production process of the die A | 346 g/l |
| 2 | Adjust the channel misalignment to 20% during the production process of the die A | 333 g/l |
| 3 | Adjust the channel misalignment to 30% during the production process of the die A | 322 g/l |
| 4 | Adjust the channel misalignment to 40% during the production process of the die A | 309 g/l |
| 5 | Adjust the channel misalignment to 0% during the production process of the die B | 340 g/l |
| 6 | Adjust the channel misalignment to 20% during the production process of the die B | 331 g/l |
| 7 | Adjust the channel misalignment to 30% during the production process of the die B | 318 g/l |
| 8 | Adjust the channel misalignment to 40% during the production process of the die B | 305 g/l |
| 9 | Adjust the channel misalignment to 0% during the co-production process of the dies A and B | 725 g/l |
| 10 | Adjust the channel misalignment to 20% during the co-production process of the dies A and B | 685 g/l |
| 11 | Adjust the channel misalignment to 30% during the co-production process of the dies A and B | 654 g/l |
| 12 | Adjust the channel misalignment to 40% during the co-production process of the dies A and B | 621 g/l |

It can be obtained by analysis based on the above test data that the technical application case of the invention can realize on-line adjustment of the mechanical energy. The volume weight of extruded granules is controlled by adjusting the percentage of misalignment of the channels.

By comparing the above three groups of test data, it can be concluded that the processing technology and device applied in the technical solution of Embodiment 1 of the invention can realize the non-stop die switch, and at the same time, can realize the control of the mechanical energy, avoid the adhesion of the granules and avoid leakage of the vapor.

Embodiment 2

FIGS. 22-33 show a second embodiment (i.e., Embodiment 2) of an extruder with the non-stop die change device according to the invention.

Referring to FIGS. 22-27, in Embodiment 2, an extruder includes a base 10 for supporting the entire extruder, and a motor 1 directly connected with the base 10, wherein the motor is directly connected with a gearbox 2, the gearbox 2 is connected with a long housing-shaped multi-section extrusion cavity 4, and a feed extrusion cavity 3 is provided near the start position of the extrusion cavity. The tail end of the extrusion cavity is connected with a die change device 5, which includes two dies: a die A 15-1 and a die B 15-2. The die A and the die B are connected with a cutting device A 6-1 and a cutting device B 6-2, respectively.

The cutting device A 6-1 is connected with a sealed vertical air duct 7-1 installed at the upper part thereof, then the vertical air duct 7-1 is connected with a bend 8-1, and the bend 8-1 is connected with a horizontal air duct 9-1 afterwards.

The cutting device B 6-2 is connected with a sealed vertical air duct 7-2 installed at the upper part thereof, then the vertical air duct 7-2 is connected with a bend 8-2, and the bend 8-2 is connected with a horizontal air duct 9-2 afterwards.

Figure 26:
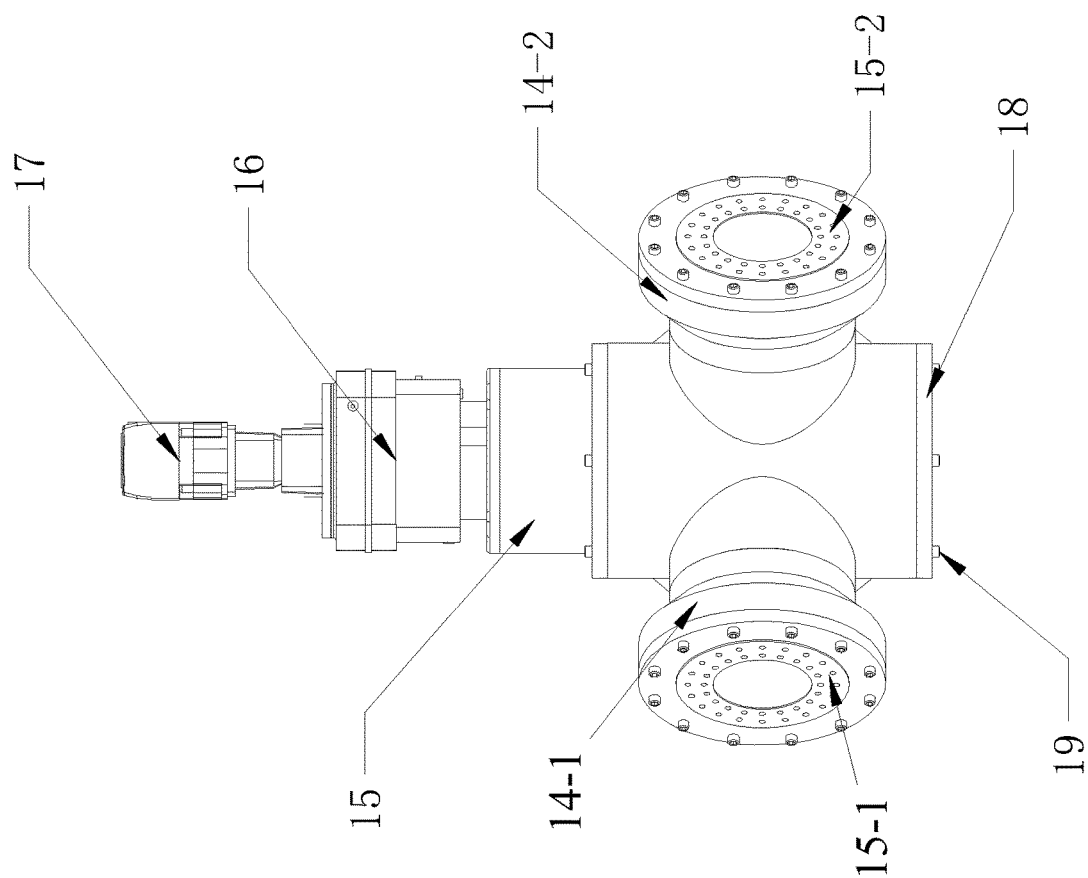
FIG. 26 is a front view of the die change device of the extruder with the non-stop die change device according to Embodiment 2 of the invention.
Figure 27:
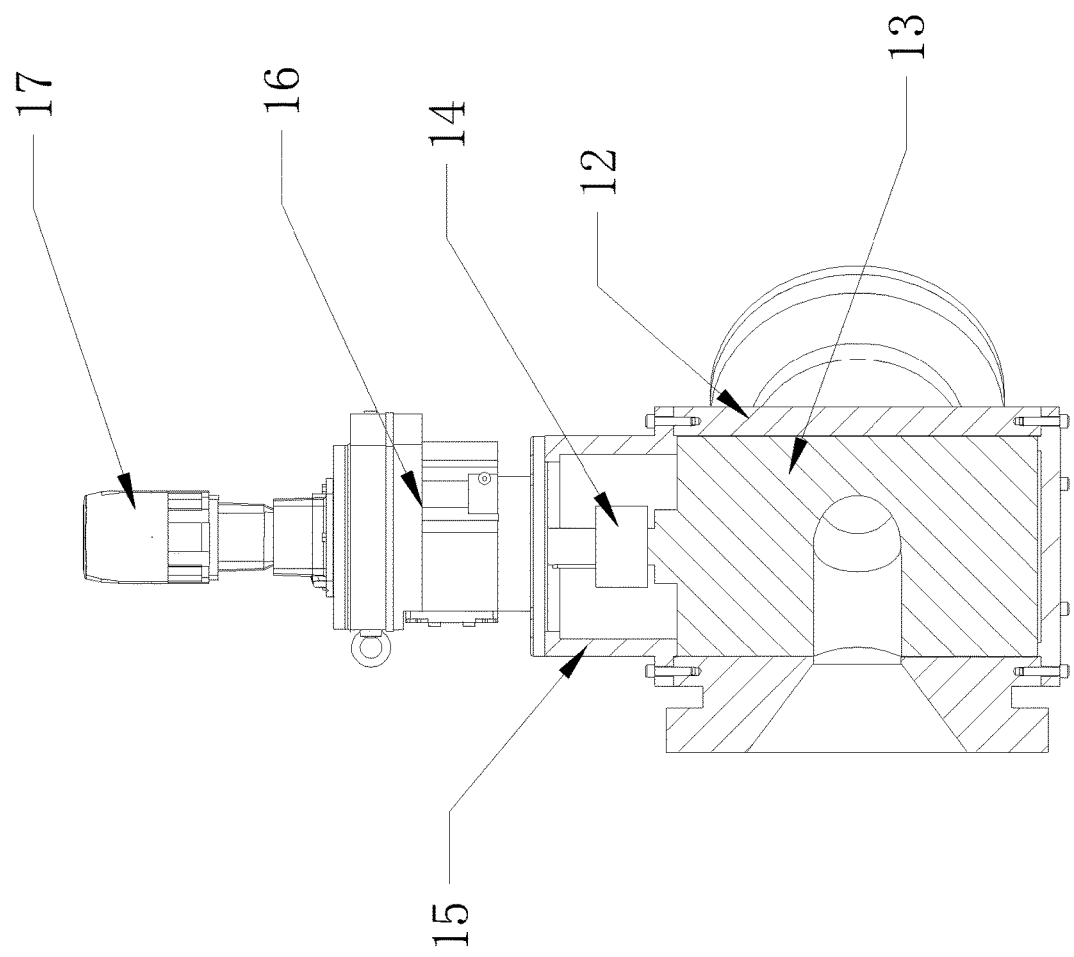
FIG. 27 is a sectional view of the die change device in FIG. 26.

In combination with FIGS. 26 and 27, the die change device 5 includes a vertical cylindrical housing 12, a rotating block 13 that can rotate is arranged in the housing 12, a gearbox 16 is installed at the upper part of the rotating block 13, and the gearbox 16 is connected with the rotating block 13 via a coupler 14. The gearbox 16 is fixed with the housing 12 via a supporting rack 15. A drive motor 17 is installed above the gearbox. During operation, the drive motor drives the gearbox to run, and the drives the rotating block to rotate via the coupler. In the embodiment, the gearbox 16 is a decelerator.

The housing 12 includes a feeding port 23, a discharging port A 20-1 and a discharging port B 20-2. The included angle between the centerline of the feeding port 23 and the centerline of the discharging port A 20-1 is D1; and the included angle between the centerline of the feeding port 23 and the centerline of the discharging port B 20-2 is D2. D1 is 85°-125°, preferably 120° and 90°, and D1 is absolutely equal to D2, or the absolute value of the angle value of D1-D2 is less than or equal to 5°.

The discharging port A is connected with a shunt 14-1, and the shunt 14-1 is connected with the die A 15-1. The die A 15-1 is connected with the cutting device A 6-1 afterwards. The cutting device A includes a cutter A 16-1.

The discharging port B is connected with a shunt 14-2, and the shunt 14-2 is connected with the die B 15-2. The die B 15-2 is connected with the cutting device B 6-2 afterwards. The cutting device B includes a cutter B 16-2.

The rotating block 13 can rotate horizontally in the housing 12, and the rotating power of the rotating block 13 comes from the drive motor and the gearbox installed at the upper part of the housing. The angular velocity of the rotating block 13 is 0.08°-160° m/s, preferably 8°-40°/s. During the operation of the extruder, the rotating block 13 can stay at any position inside the housing 12 as required and can be held.

The rotating block 13 includes two access channels: a channel A 21 and a channel B 22. The included angle between the channel A and the channel B is equal to D1.

Figure 28:
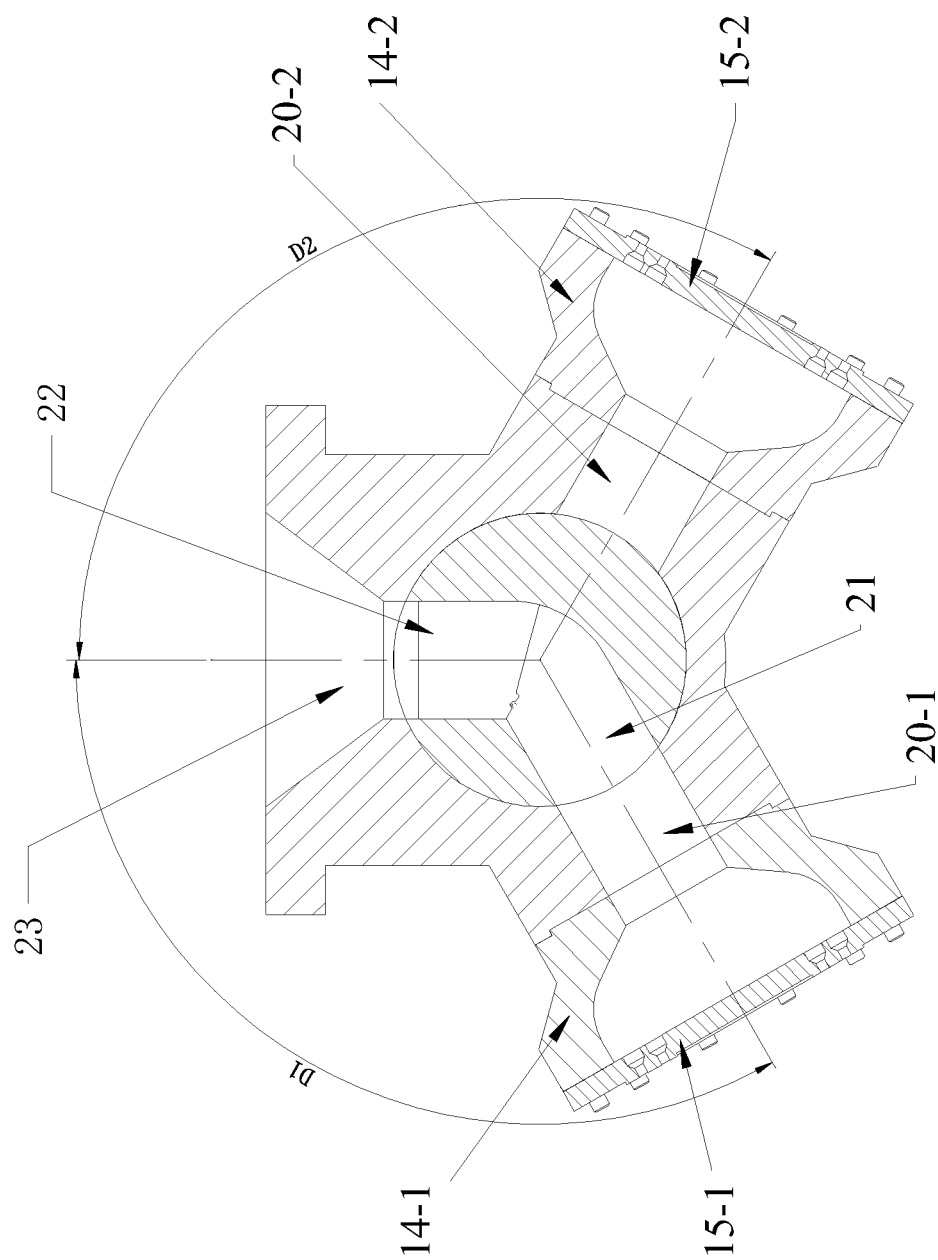
FIG. 28 is a transverse sectional view of the die change device including a rotating block in FIG. 27 and shows the working state of die A.

As shown in FIG. 28, when the channel A 21 is opposite to the discharging port 20-1, the channel B 22 is just opposite to the feeding port 23, and the rotating block 13 just blocks the discharging port B 20-2.

During the production process, the material enters the channel B from the feeding port 23. Since the channel B is connected with the channel A, the material enters the discharging port A 20-1 along the two connected channels. The discharging port A is connected with the die A 15-1. At this time, the die A can work. The rotating block 13 blocks the discharging port B 20-2, so the material will not enter the discharging port B, the material will not be extruded from the die B connected with the discharging port B, and the die B is in a non-operation state.

Figure 30:
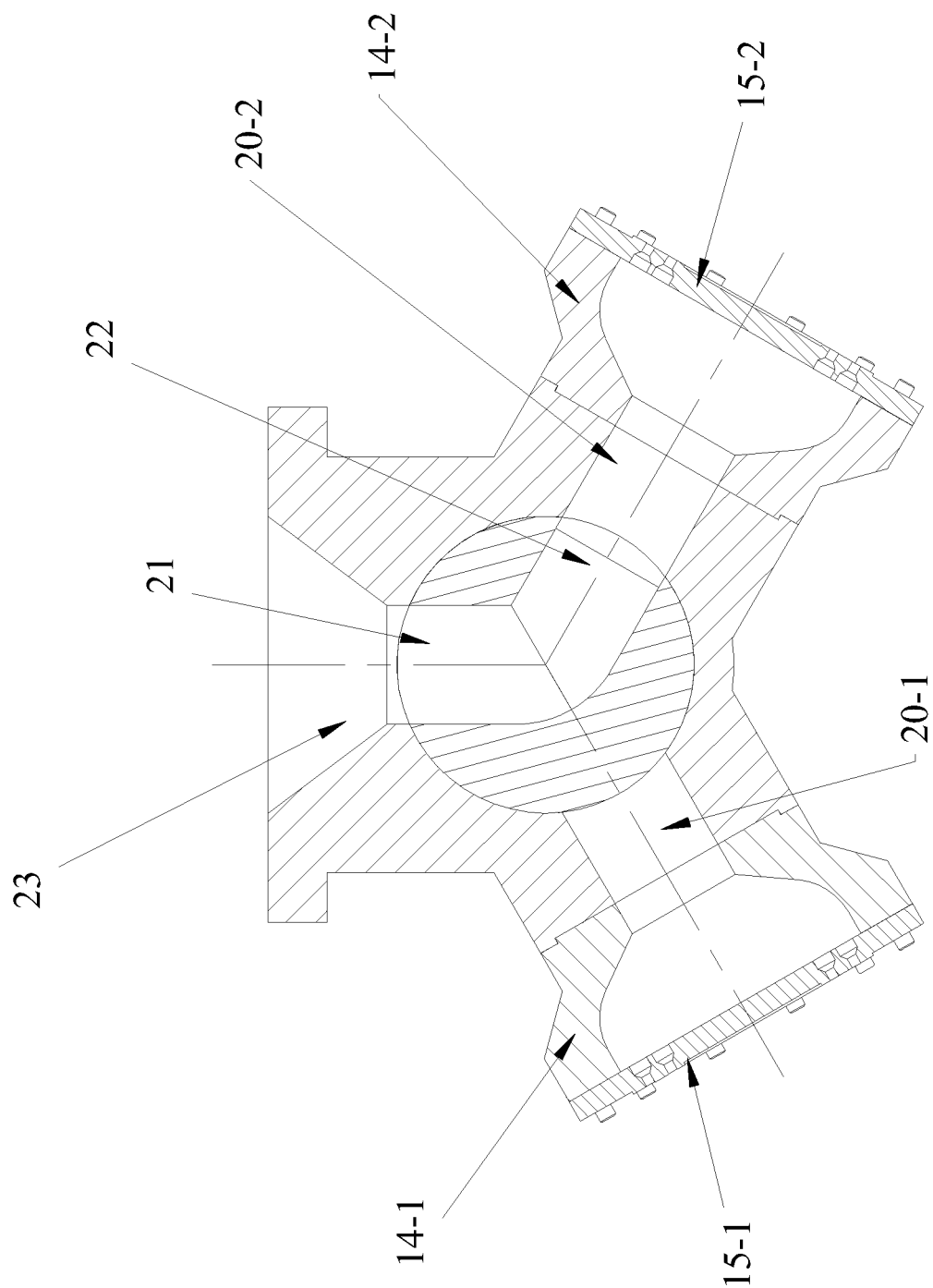
FIG. 30 is a transverse sectional view of the die change device including a rotating block in FIG. 27 and shows the working state of die B.

As shown in FIG. 30, when the rotating block 13 rotates and the channel A 21 is just opposite to the feeding port 23, the rotating block stops moving and is fixed. At this time, the channel B 22 is just opposite to the discharging port B 20-2, and the rotating block 13 just blocks the discharging port A 20-1.

During the production process, when the rotating block rotates to the above position, the material enters the channel A from the feeding port 23. Since the channel A is connected with the channel B, the material enters the discharging port B 20-2 along the two connected channels. The discharging port B 20-2 is connected with the die B 15-2. At this time, the die B can work. The rotating block 13 blocks the discharging port A 20-1, so the material will not enter the discharging port A, the material will not be extruded from the die A connected with the discharging port A, and the die A is in a non-operation state.

In combination with FIGS. 28 and 30, when the die A 17-1 is selected for production, the channel A 22 on the rotating block moves to the feeding port 20 through the action of the driving device 25, the material is extruded into the discharging port A through the channel A, and the die A is in an operation state at this time. Since the rotating block 19 blocks the discharging port B 21-2, there is no material at the discharging port B, and the discharging port B is in a non-operation state.

Through the rotation of the rotating block as described above, the operation switching relationship between the die A and the die B is realized, and the change of the die is also realized. At the same time, the rotating block rotates the angle D1 within 0.1 to 10 seconds, which is relatively short. Thus, non-stop die change can be realized.

Figure 32:
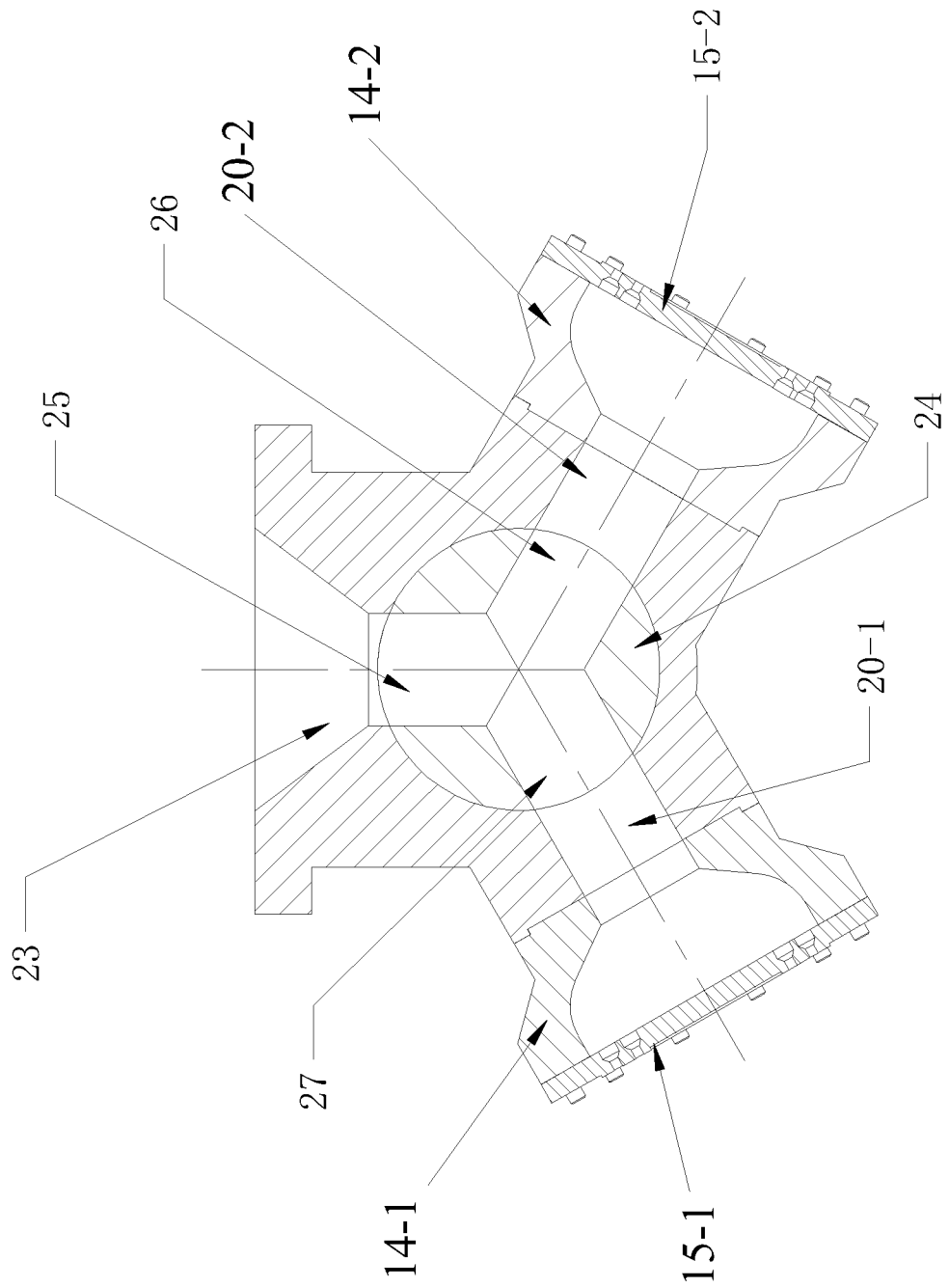
FIG. 32 is a transverse sectional view of the die change device in FIG. 27, replaces the rotating block with a three-way rotating block, and shows the state when the die A and the die B work simultaneously.

Referring to FIG. 32, when the rotating block 13 is changed into a three-channel rotating block 24, the three-channel rotating block 24 simultaneously has a rotatable function. The rotating block 24 includes a channel I 25, a channel II 26 and a channel III 27. When the channel I 25 is opposite to the feeding port 23, the channel II 26 is just opposite to the discharging port B 20-2, and the channel III 27 is just opposite to the discharging port A 20-1.

Since the channel I 25, the channel II 26 and the channel III 27 communicate with each other, during production, when the material flows in from the feeding port 23, the material will enter the die A through the channel III 27 and enter the die B through the channel II 26. In this way, the co-production function of the two dies is realized.

Figure 29:
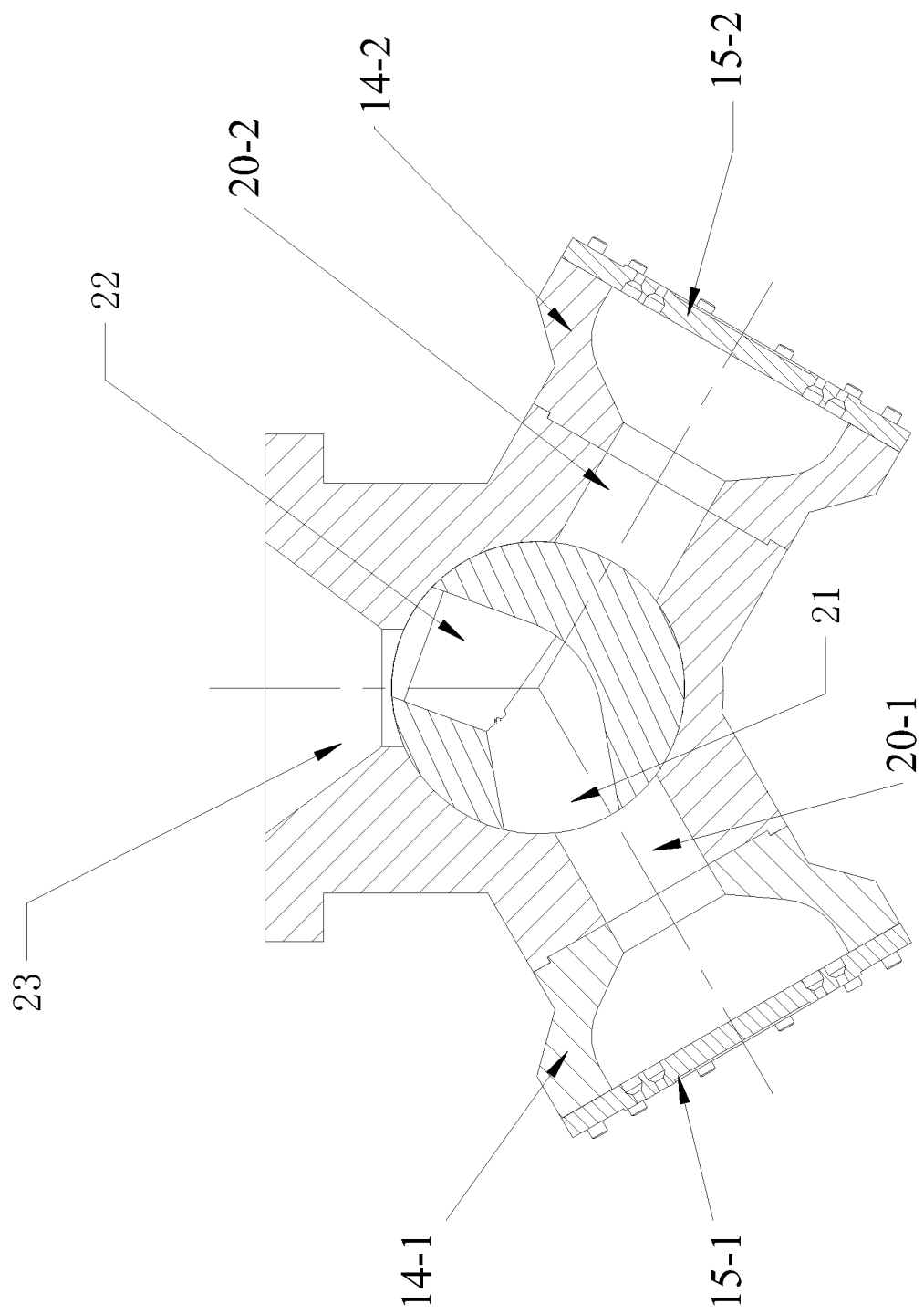
FIG. 29 is a transverse sectional view of the die change device including a rotating block in FIG. 27 and shows the state when the die A works and adjusts the mechanical energy borne by the material.
Figure 31:
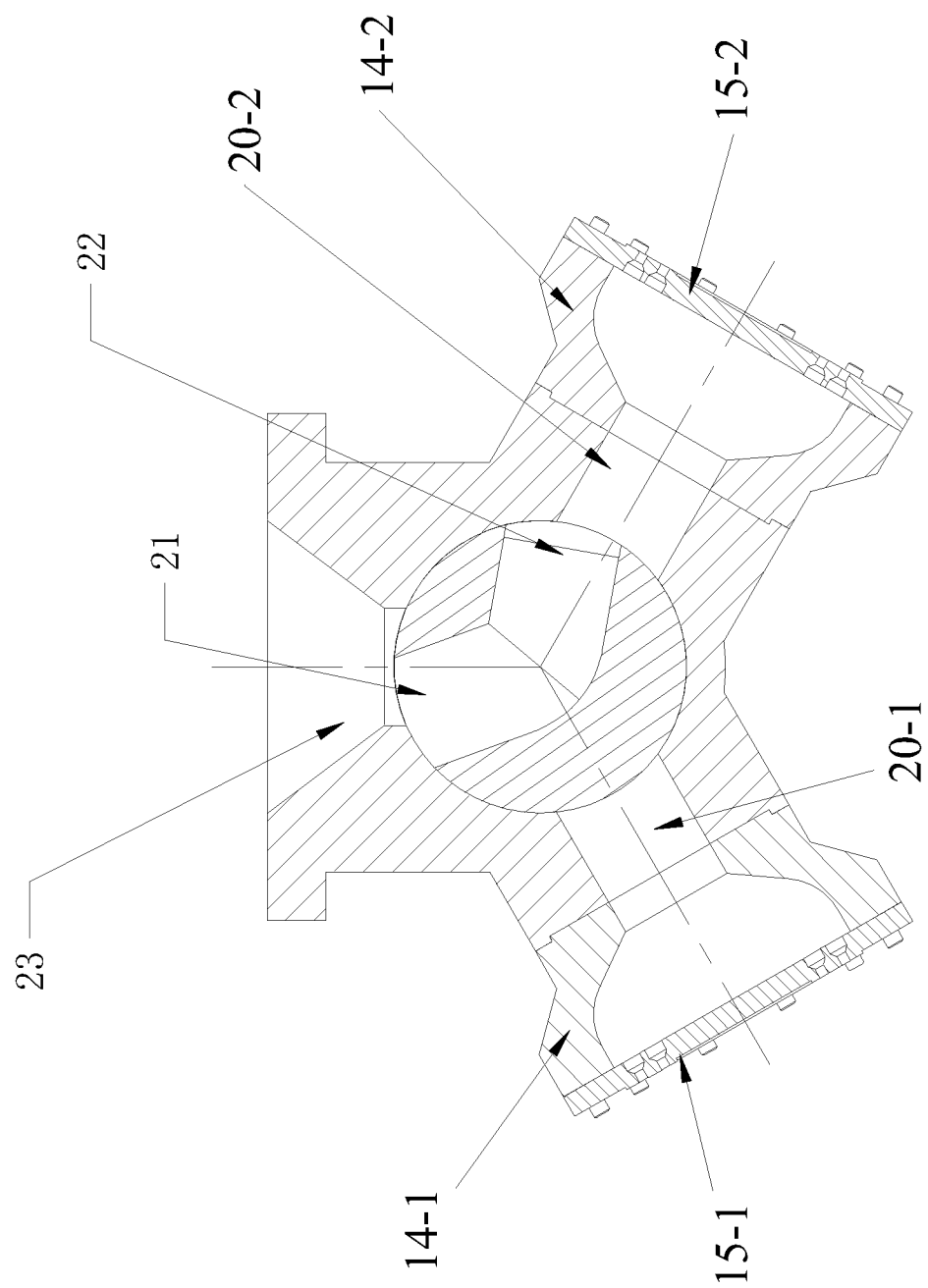
FIG. 31 is a transverse sectional view of the die change device including a rotating block in FIG. 27 and shows the state when the die B works and adjusts the mechanical energy borne by the material.

In combination with FIGS. 29 and 31, the invention can control the mechanical energy during the production process. When the die A is used for production, a certain degree of misalignment can be formed between the discharging port A 20-1 and the channel A 21 through the rotation of the rotating block. Compared to alignment, the resistance of the material at this position increases. If the degree of misalignment is larger, the resistance is larger and the mechanical energy borne by the material is larger.

Therefore, the rotating block 13 can stay at different positions as needed to control the magnitude of the mechanical energy borne by the material in the extruder. The rotating block 13 can also be adjusted at different positions in the working state of the extruder without stop. Therefore, on-line adjustment of the mechanical energy can be realized.

Similarly, when the die B is used for production, the above function can also be realized as same as the previous die A.

Figure 33:
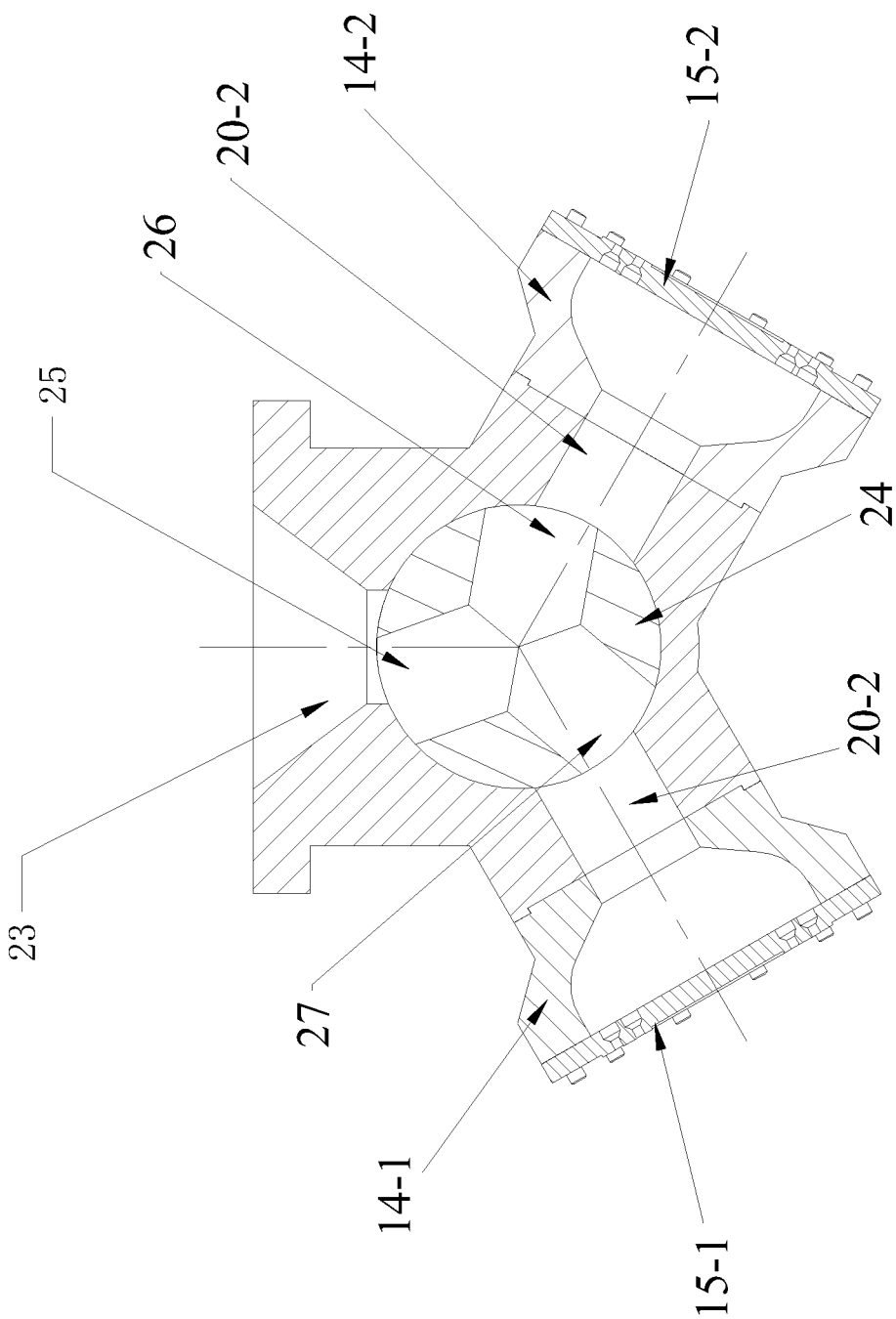
FIG. 33 is a transverse sectional view of the die change device in FIG. 27, replaces the rotating block with a three-way rotating block, and shows the state when the die A and the die B work simultaneously and adjust the mechanical energy borne by the material.

In combination with FIG. 33, similarly, when the die A and the die B are used for production simultaneously, the above function can also be realized as same as the previous die A.

The extruder with non-stop die change device in Embodiment 2 can avoid granule adhesion, leakage of water vapor and pollution to the surrounding environment during the production process.

The extruded product coming out of the die, along with a large amount of vapor, is pneumatically conveyed to next process. Because such a working condition is in negative pressure, the leakage of on-site vapor is avoided.

In addition, since the granules do not fall freely but are pneumatically conveyed, the granules do not touch each other, and the problems of granule deformation and adhesion are not produced.

Hereinafter, the extruder in Embodiment 2 is tested to prove that the invention can achieve the declared beneficial effects.

The dies used in the test of Embodiment 2 are dies having the apertures of 3.0 mm. The main motor load current of the extruder is 90%, and the capacity of the extruder is 6 t/h.

The rotating block in the die change device can reciprocate up and down in the housing under the action of the driving device. In Embodiment 2, the rotating speed of the rotating block is 30°/s. During the operation of the extruder, the rotating block can stay at any position inside the housing as required.

In Embodiment 2, the included angle D1 between the centerline of the feeding port and the centerline of the discharging port A is 120°. The included angle D2 between the centerline of the feeding port 20 and the centerline of the discharging port B is also 120°.

Embodiment 2 involves two steps, wherein the first step is to test die change data using the rotating block of two channels having the included angle of 120°; and the second step is to test production data using the rotating block of three channels having the included angles of 120°.

When Embodiment 2 is adopted, the test formula is shown in table 6. The crushed material has such fineness that 95% passes through a 80-mesh sieve, 99.5% passes through a 60-mesh sieve and 100% passes through a 50-mesh sieve. The material is first pre-cured in an ordinary conditioner. The degree of gelatinization of the material after being pre-cured in the conditioner is 45%, the temperature of the material is 95° C., and the water content of the material is 24%. When the material enters the extruder, it is first extruded through the die A and cut into extruded granules through the cutter A, and the extruded granules enter the inlet A through the sealed vertical air duct and finally enter next process from the outlet.

TABLE 6

| Formula of material (weight percentage) | |
| --- | --- |
| Soybean meal | 27 |
| Wheat flour | 25 |
| Wheat bran | 18 |
| Rape seed cake | 27 |
| Grease | 3 |
| Total | 100 |

In Embodiment 2, the test is divided into two steps, wherein the first step is dual-channel test, and the second step is three-channel test. The test data includes the following:

1. First Group of Data (Dual-Channel Test)

13) Test whether the die A can be switched to the die B without stop, and the stable production of the extruder can also be kept after the switching;

14) Test the time length of non-stop die change, wherein the starting point of the time length is when an instruction for switching the die is transmitted to a pore subsystem during the stable production process of the die A; and the terminating point is when the die switch is completed, the die B starts stable production and a qualified expanded product can be processed.

15) Test the maximum fluctuation range of the main motor current before the switch;

16) Test the maximum fluctuation range of the main motor current in the process of switching the die;

17) Test the comparison of the extrusion coefficients of extruded granules before and after the die switch;

18) Test the comparison of the volume weights of extruded granules before and after the die switch;

19) Test the comparison of the floating rates of the product before and after the die switch;

20) Test the comparison of the length uniformity of extruded granules before and after the die switch;

21) Visually inspect whether water vapor leaks nearby the cutting device before the die switch;

22) Visually inspect whether water vapor leaks nearby the cutting device after the die switch;

23) Sample 2 kg of extruded granules before the die switch to check the number of adhered extruded granules;

24) Sample 2 kg of extruded granules after the die switch to check the number of adhered extruded granules;

25) During the production process of the die B, adjust the mechanical energy, adjust the channel misalignment to 20%, and check the change of volume weight;

26) During the production process of the die B, adjust the mechanical energy, adjust the channel misalignment to 30%, and check the change of volume weight; and 27) During the production process of the die B, adjust the mechanical energy, adjust the channel misalignment to 40%, and check the change of volume weight.

TABLE 7

| | Switch die A to die B | |
| --- | --- | --- |
| No. | Test items | Data |
| 1 | Time length of non-stop die change | 2.2 s |
| 2 | Maximum current fluctuation before the switch | ±8 A |
| 3 | Maximum current fluctuation during the switch | ±12 A |
| 4 | Maximum current fluctuation after the switch | ±9 A |
| 5 | Extrusion coefficient of granules before the switch | 1.7 |
| 6 | Extrusion coefficient of granules after the switch | 1.7 |
| 7 | Volume weight of granules before the switch | 346 g/l |
| 8 | Volume weight of granules after the switch | 340 g/l |
| 9 | Floating rate of granules before the switch | 100% float |
| 10 | Floating rate of granules after the switch | 100% float |
| 11 | Maximum length difference of granules before the switch | ±0.21 mm |
| 12 | Maximum length difference of granules after the switch | ±0.23 mm |
| 13 | Whether vapor leaks nearby the cutting device before cutting | No |
| 14 | Whether vapor leaks nearby the cutting device after cutting | No |
| 15 | Sample 2 kg of extruded granules before the die switch to check the number of adhered extruded granules | No |
| 16 | Sample 2 kg of extruded granules after the die switch to check the number of adhered extruded granules | No |
| 17 | Adjust the channel misalignment to 0% during the production process of the die B | 340 g/l |
| 18 | Adjust the channel misalignment to 20% during the production process of the die B | 331 g/l |
| 19 | Adjust the channel misalignment to 30% during the production process of the die B | 318 g/l |
| 20 | Adjust the channel misalignment to 40% during the production process of the die B | 305 g/l |

It can be obtained by analysis based on the above test data that the technical application case of the invention can realize non-stop switch from the die A to the die B within a short time. At the same time, the data does not fluctuate greatly during and after the switching, and the quality of the product before and after the switch can be kept consistent.

2. Second Group of Data (Dual-Channel Test)

13) Test whether the die B can be switched to the die A without stop, and the stable production of the extruder can also be kept after the switching;

14) Test the time length of non-stop die change, wherein the starting point of the time length is when an instruction for switching the die is transmitted to a pore subsystem during the stable production process of the die B; and the terminating point is when the die switch is completed, the die A starts stable production and a qualified expanded product can be processed.

15) Test the maximum fluctuation range of the main motor current before the switch;

16) Test the maximum fluctuation range of the main motor current in the process of switching the die;

17) Test the comparison of the extrusion coefficients of extruded granules before and after the die switch;

18) Test the comparison of the volume weights of extruded granules before and after the die switch;

19) Test the comparison of the floating rates of the product before and after the die switch;

20) Test the comparison of the length uniformity of extruded granules before and after the die switch;

21) Visually inspect whether water vapor leaks nearby the cutting device before the die switch;

22) Visually inspect whether water vapor leaks nearby the cutting device after the die switch;

23) Sample 2 kg of extruded granules before the die switch to check the number of adhered extruded granules;

24) Sample 2 kg of extruded granules after the die switch to check the number of adhered extruded granules;

25) During the production process of the die A, adjust the mechanical energy, adjust the channel misalignment to 20%, and check the change of volume weight;

26) During the production process of the die A, adjust the mechanical energy, adjust the channel misalignment to 30%, and check the change of volume weight; and 27) During the production process of the die A, adjust the mechanical energy, adjust the channel misalignment to 40%, and check the change of volume weight.

TABLE 8

| | Switch die B to die A | |
|---|---|---|
| No. | Test items | Data |
| 1 | Time length of non-stop die change | 2.2 s |
| 2 | Maximum current fluctuation before the switch | ±7 A |
| 3 | Maximum current fluctuation during the switch | ±13 A |
| 4 | Maximum current fluctuation after the switch | ±10 A |
| 5 | Extrusion coefficient of granules before the switch | 1.7 |
| 6 | Extrusion coefficient of granules after the switch | 1.7 |
| 7 | Volume weight of granules before the switch | 341 g/l |
| 8 | Volume weight of granules after the switch | 344 g/l |
| 9 | Floating rate of granules before the switch | 100% float |
| 10 | Floating rate of granules after the switch | 100% float |
| 11 | Maximum length difference of granules before the switch | ±0.19 mm |
| 12 | Maximum length difference of granules after the switch | ±0.21 mm |
| 13 | Whether vapor leaks nearby the cutting device before cutting | No |
| 14 | Whether vapor leaks nearby the cutting device after cutting | No |
| 15 | Sample 2 kg of extruded granules before the die switch to check the number of adhered extruded granules | No |
| 16 | Sample 2 kg of extruded granules after the die switch to check the number of adhered extruded granules | No |
| 17 | Adjust the channel misalignment to 0% during the production process of the die A | 346 g/l |
| 18 | Adjust the channel misalignment to 20% during the production process of the die A | 333 g/l |
| 19 | Adjust the channel misalignment to 30% during the production process of the die A | 322 g/l |
| 20 | Adjust the channel misalignment to 40% during the production process of the die A | 309 g/l |

It can be obtained by analysis based on the above test data that the technical application case of the invention can realize non-stop switch from the die B to the die A within a short time. At the same time, the data does not fluctuate greatly during and after the switching, and the quality of the product before and after the switch can be kept consistent.

3. Third Group of Data (Three-Channel Test)

13) Test whether the extruder can realize stable production when the die A and the die B work at the same time;

14) Test the maximum fluctuation range of the main motor current in the production process;

15) Test the comparison of the extrusion coefficients of extruded granules of the die A and the die B;

16) Test the comparison of the volume weights of extruded granules of the die A and the die B;

17) Test the comparison of the floating rates of extruded granules of the die A and the die B;

18) Test the comparison of the length uniformity of extruded granules of the die A and the die B;

19) Visually inspect whether water vapor leaks nearby the cutting device;

20) Sample 2 kg of extruded granules, before the die A is used, to check the number of adhered extruded granules;

21) Sample 2 kg of extruded granules, before the die B is used, to check the number of adhered extruded granules;

22) During the co-production process of the die A and the die B, adjust the mechanical energy, adjust the channel misalignment to 20%, and check the change of volume weight;

23) During the co-production process of the die A and the die B, adjust the mechanical energy, adjust the channel misalignment to 30%, and check the change of volume weight; and 24) During the co-production process of the die A and the die B, adjust the mechanical energy, adjust the channel misalignment to 40%, and check the change of volume weight.

TABLE 9

| | Switch die B to simultaneous operation of die A and die B | |
|---|---|---|
| No. | Test items | Data |
| 1 | Whether stable production can be realized | OK |
| 2 | Maximum current fluctuation during the production process | ±8 A |
| 3 | Extrusion coefficient with the use of die A | 1.71 |
| 4 | Extrusion coefficient with the use of die B | 1.72 |
| 5 | Volume weight of granules with the use of die A | 726 g/l |
| 6 | Volume weight of granules with the use of die B | 725 g/l |
| 7 | Sink rate with the use of die A | 100% |
| 8 | Sink rate with the use of die B | 100% |
| 9 | Length average value of 100 granules with the use of die A | 4.31 mm |
| 10 | Length average value of 100 granules with the use of die B | 4.35 mm |
| 11 | Whether vapor leaks nearby the cutting device | No |
| 12 | Sample 2 kg of extruded granules, when the die A is used, to check the number of adhered extruded granules | No |
| 13 | Sample 2 kg of extruded granules, when the die B | No |

TABLE 9-continued

Switch die B to simultaneous operation of die A and die B

| No. | Test items | Data |
|---|---|---|
|  | is used, to check the number of adhered extruded granules |  |
| 14 | Adjust the channel misalignment to 0% during the co-production process of the dies A and B | 725 g/l |
| 15 | Adjust the channel misalignment to 20% during the co-production process of the dies A and B | 685 g/l |
| 16 | Adjust the channel misalignment to 30% during the co-production process of the dies A and B | 654 g/l |
| 17 | Adjust the channel misalignment to 40% during the co-production process of the dies A and B | 621 g/l |

It can be obtained by analysis based on the above test data that the technical application case of the invention can realize simultaneous operation of the die A and the die B. At the same time, the mechanical energy can be controlled.

By comparing the above three groups of test data, it can be concluded that the processing technology and device applied in the technical solution of Embodiment 2 of the invention can realize the non-stop die switch, and at the same time, can realize the control of the mechanical energy, avoid the adhesion of the granules and avoid leakage of the vapor.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use condied. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. An extruder with a non-stop die change device, comprising:

an extrusion cavity, a feeding port located at an upper part in the extrusion cavity, a die change device located at an outlet of the extrusion cavity, and a conveyor arranged in the extrusion cavity for conveying a material to the die change device;

wherein the die change device comprises a housing, a movable block located in the housing, a driving device for driving the movable block, a first die connected to a side wall of the housing, and a second die connected to the side wall of the housing; the first die is provided with a first channel that penetrates the first die and communicates with an interior of the housing; the second die is provided with a second channel that penetrates the second die and communicates with the interior of the housing; the outlet of the extrusion cavity is connected to the side wall of the housing and communicates with the interior of the housing; and the housing is a vertical housing that is perpendicular to the first channel and the second channel; and wherein a transfer channel is provided in the movable block, and the movable block is driven by the driving device to move at a first position to a second position; when the movable block moves to the first position in the housing, the transfer channel communicates to the extrusion cavity with the first channel; and when the movable block moves to the second position in the housing, the transfer channel communicates to the extrusion cavity with the second channel; and wherein the movable block is a piston vertically placed inside the housing and vertically movable in the housing along with a housing direction that is perpendicular to the first channel and the second channel.

2. The extruder with the non-stop die change device according to claim 1, wherein at least one first transfer channel and at least one second transfer channel are provided in the piston; when the piston moves to the first position in the housing, the first transfer channel communicates to the extrusion cavity with the first channel; and when the piston moves to the second position in the housing, the second transfer channel communicates to the extrusion cavity with the second channel.

3. The extruder with the non-stop die change device according to claim 2, wherein at least one third transfer channel is provided in the piston; when the piston moves to a third position in the housing, the third transfer channel communicates to the extrusion cavity with the first channel and the second channel simultaneously.

4. The extruder with the non-stop die change device according to claim 2, wherein the first transfer channel comprises a first inlet and a first outlet, the second transfer channel comprises a second inlet and a second outlet, and the side wall of the housing is provided with a feeding port for connecting the interior of the housing with the outlet of the extrusion cavity, a first discharging port for connecting the interior of the housing with the first transfer channel and a second discharging port for connecting the interior of the housing with the second transfer channel; a included angle D1 between a centerline of the feeding port on the housing and a centerline of the first discharging port is 60°-160°; and a included angle D2 defined between a centerline of the feeding port and a centerline of the second discharging port is 60°-160°.

5. The extruder with the non-stop die change device according to claim 4, wherein the included angle D1 between the centerline of the feeding port on the housing and the centerline of the first discharging port is 90°-125°; and the included angle D2 between the centerline of the feeding port and the centerline of the second discharging port is 90°-125°.

6. An extruder with the non-stop die change device comprising:

an extrusion cavity, an input port located at an upper part in the extrusion cavity, a die change device located at an outlet of the extrusion cavity, and a conveyor arranged in the extrusion cavity for conveying a material to the die change device;

wherein the die change device comprises a housing, a movable block located in the housing, a driving device for driving the movable block, a first die connected to a side wall of the housing, and a second die connected to the side wall of the housing; the first die is provided with a first channel that penetrates the first die and communicates with an interior of the housing; the second die is provided with a second channel that penetrates the second die and communicates with the interior of the housing; and the outlet of the extrusion cavity is connected to the side wall of the housing and communicates with the interior of the housing;

wherein a transfer channel is provided in the movable block, and the movable block is driven by the driving device to move at a first position to a second position; when the movable block moves to the first position in the housing, the transfer channel communicates to the extrusion cavity with the first channel; and when the movable block moves to the second position in the housing, the transfer channel communicates to the extrusion cavity with the second channel;

wherein the movable block is a rotating block rotatable in the housing; wherein in operation, when the rotating block rotates to the first position, a first port communicates with the extrusion cavity and a second port communicates with the first channel; and when the rotating block rotates to the second position, the second port communicates with the extrusion cavity, and the first port communicates with the second channel; and wherein when the first die and the second die are simultaneously used for production, the rotating block is replaced with a three-way rotating block that is provided with a three-way transfer channel comprising a channel I, and a channel II and a channel III that communicate with the channel I at the same time, and when the driving device drives the three-way rotating block to rotate till the channel I communicates with the extrusion cavity, the channel II communicates with the first channel and the channel III communicates with the second channel.

7. The extruder with the non-stop die change device according to claim 6, wherein the side wall of the housing is provided with a feeding port for connecting the interior of the housing with the outlet of the extrusion cavity, a first discharging port for connecting the interior of the housing with the first transfer channel and a second discharging port for connecting the interior of the housing with the second transfer channel; a included angle D1 between a centerline of the feeding port on the housing and a centerline of the first discharging port is 85°-125°; and a included angle between a centerline of the feeding port and a centerline of the second discharging port is D2, D2 is equal to D1 or the absolute value of the angle value of D1-D2 is less than or equal to 5°.

8. The extruder with the non-stop die change device according to claim 7, wherein the included angle D1 between the centerline of the feeding port on the housing and the centerline of the first discharging port is 120° or 90°.

9. The extruder with the non-stop die change device according to claim 1, further comprising a first cutting device connected with the first die, a second cutting device connected with the second die, a first air duct connected with the first cutting device, and a second air duct connected with the second cutting device.

10. The extruder with the non-stop die change device according to claim 9, further comprising a three-way valve connected with the first air duct and the second air duct at the same time, wherein the three-way valve is provided with a first inlet, a second inlet and a switch valve outlet, the first inlet communicates with the first air duct, and the second inlet communicates with the second air duct.

11. The extruder with the non-stop die change device according to claim 10, wherein the three-way switch comprises a switch plate located between the two inlets and the switch valve outlet and a driving device for driving the switch plate, and the switch plate is provided with a first channel port and a second channel port; when the first inlet is used, the switch plate is driven to enable the first channel port to be aligned with the first inlet, and the switch plate blocks the second inlet; when the first inlet and the second inlet are used simultaneously, the driving device drives the switch plate to move forward, so that the first channel port is aligned with the second inlet and the second channel port is aligned with the first inlet; and when the second inlet is used, the driving device continues to drive the switch plate to move forward, the second channel port is aligned with the second inlet, and the switch plate blocks the first inlet.

12. The extruder with the non-stop die change device according to claim 11, wherein the first air duct comprises a first vertical air duct connected with the first cutting device and extending upward from the first cutting device, a first bend connected to the upper end of the first vertical air duct and bent to the horizontal direction, and a first horizontal air duct connected to the horizontal end of the first bend and continuously horizontally extending to connect with the first inlet; and the second air duct comprises a second vertical air duct connected with the second cutting device and extending upward from the second cutting device, a second bend connected to the upper end of the second vertical air duct and bent to the horizontal direction, and a second horizontal air duct connected to the horizontal end of the second bend and continuously horizontally extending to connect with the second inlet.

13. The extruder with the non-stop die change device according to claim 1, wherein the conveyor in the extrusion cavity is a screw rod, and the rear end of the extrusion cavity is connected with a gearbox and a motor for driving the screw rod to rotate.

* * * * *